US006574528B1

(12) United States Patent
Toya et al.

(10) Patent No.: US 6,574,528 B1
(45) Date of Patent: Jun. 3, 2003

(54) CARD ASSEMBLY APPARATUS, CARD INSPECTING APPARATUS AND CARD MAGAZINE USED THEREFOR

(75) Inventors: Takashi Toya, Tokyo (JP); Mitsuo Kougo, Tokyo (JP); Yutaka Sakai, Tokyo (JP)

(73) Assignee: TDK Corporation, Tokyo (JP)

( * ) Notice: Subject to any disclaimer, the term of this patent is extended or adjusted under 35 U.S.C. 154(b) by 294 days.

(21) Appl. No.: 09/590,080

(22) Filed: Jun. 9, 2000

(51) Int. Cl.[7] ............................ G06F 7/00; B07C 5/344
(52) U.S. Cl. ........................ 700/213; 700/223; 209/573
(58) Field of Search ................................ 700/213, 222, 700/223; 209/573, 911, 924

(56) References Cited

U.S. PATENT DOCUMENTS

| | | | | |
|---|---|---|---|---|
| 3,608,892 A | * | 9/1971 | Newman | 271/128 |
| 5,611,436 A | | 3/1997 | Ashby | |
| 5,865,319 A | * | 2/1999 | Okuda et al. | 209/574 |
| 5,973,285 A | * | 10/1999 | Dietrich et al. | 209/573 |
| 6,176,424 B1 | * | 1/2001 | Meyer-Wittreck et al. | 235/381 |

FOREIGN PATENT DOCUMENTS

| | | |
|---|---|---|
| JP | A05-046819 | 2/1993 |
| JP | A-05-208577 | 8/1993 |
| JP | A-07-006220 | 1/1995 |

* cited by examiner

*Primary Examiner*—Christopher P. Ellis
*Assistant Examiner*—Gene O. Crawford
(74) *Attorney, Agent, or Firm*—Oliff & Berridge, PLC

(57) ABSTRACT

The invention relates to a card assembly apparatus for assembling PC cards and the like, and it is an object of the invention to provide a card assembly apparatus which makes it possible to reduce costs required for card assembly and to improve the throughput of card assembly. It has a top side processing portion 1 for performing predetermined assembly processes on a top side of a card and a bottom side processing portion 2 for performing predetermined assembly processes on a bottom side of a card. A supply magazine portion 10, a resin applying portion 20, a sheet inserting portion 30, a cover inserting portion 40, a thermo-compression bonding portion 50 and a compression bonding portion 60 are provided in the top side processing portion 1, and a resin applying portion 20', a sheet inserting portion 30', a cover inserting portion 40', thermo-compression bonding portions 50' and 50", compression bonding portions 60' and 60" and a housing magazine portion 80 are provided in the bottom side processing portion 2 where those portions are listed above in the order of their X values increasing in the positive direction. There is also provided a transport portion 90 for transporting PC cards in a path extending from the supply magazine portion 10 to the housing magazine portion 80.

4 Claims, 17 Drawing Sheets

CARD ASSEMBLY APPARATUS, CARD INSPECTING APPARATUS AND CARD MAGAZINE USED THEREFOR

BACKGROUND OF THE INVENTION

1. Field of the Invention

The present invention relates to a card assembly apparatus for assembling PC cards and the like.

The present invention also relates to a card inspecting apparatus for conducting, for example, an electrical inspection of PC cards and, more particularly, to a card inspecting apparatus capable of performing steps of an electrical inspection from a card supplying step up to an inspection/ejection step.

Further, the present invention relates to a card magazine capable of housing a plurality of PC cards which is used for, for example, a card assembly apparatus for assembling PC cards and the like and a card inspecting apparatus for conducting an electrical test on assembled PC cards.

2. Description of the Related Art

Recently, there is increasing use of compact cards, including PC cards in compliance with PCMCIA (Personal Computer Memory Card International Association), which provide predetermined functions when inserted into personal computers (hereinafter abbreviated as "PCs"), audio and video apparatuses. Other compact cards other than PC cards include Compact Flashes (registered trademark of Sun Disk Corporation) and MMCs (Multimedia Cards) proposed by Multimedia Card Association. Those cards are used as storage devices having solid-state memories or data communication devices for modems, LANs (local area networks) and the like.

For example, card assembly apparatuses like that disclosed in Japanese Patent Laid-Open (Kokai) No. H5-208577 have been used for steps of assembling such cards. In the disclosed card assembly apparatus, automation is achieved in steps of pressing, heating and cooling memory cards which have been manually tentatively bonded. A heat block is heated up in advance, and a pressing cylinder is elevated to press and heat memory cards between the heat block and itself. This melts bonding sheets which are thereafter thermally set to achieve final bonding. There is also provided a pressure adjuster which absorbs variations of the thickness of memory cards to apply a uniform pressure to a plurality of memory cards.

However, the above-described conventional card assembly apparatus automates only a part of card assembly steps and, for example, no mechanism is provided to apply reinforcement resin for filling a part of a gap between a substrate and a shield cover of a card. Therefore, the application of reinforcement resin is still troublesome in that an operator must manually apply the reinforcement resin to the substrate or shield cover of each card.

Further, since the conventional card assembly apparatus includes no mechanism for inserting an insulation sheet between a substrate and a shield cover, the insertion of an insulation sheet necessitates a manual step to be performed by an operator, which results in a problem in that the throughput of card assembly is reduced. Similarly, the insertion of a shield cover into a frame also relies on a manual operation because no mechanism is provided therefor, which is a factor that hinders improvement of yield of manufacture. Further, the operations of supplying card to be assembled to the assembly apparatus and collecting assembled cards also rely on operators. This results in a problem in that the need for operators' intervention results in a cost increase and in that an idle time of the card assembly apparatus required to rest or replace operators reduces the throughput of card assembly.

At the final step of assembly, such cards are subjected to an electrical inspection using a card inspecting apparatus to see whether predetermined functions properly work or not. Since such a card inspecting apparatus performs a predetermined electrical inspection with the cards to be inspected inserted in a connector for electrical connection, a card inspecting apparatus having a card inserting/removing device, for example, as disclosed in Japanese Patent Laid-Open (Kokai) No. H7-6220 is used. The disclosed card inspecting apparatus has a conveyor to transport manufactured memory cards sequentially. The conveyor holds manufactured memory cards on an upper surface thereof and feeds them in a predetermined direction to transport the memory cards to the card inserting/removing device.

A Memory card which has been transported to and stopped at the inserting/removing device by the conveyor is lifted up as a result of an upward movement of a table of a lift-up mechanism and is held at the same elevation as that of an eject connector. A contact piece of a pushing mechanism is driven for protrusion in the inserting direction of the memory card to be put into contact with an end face of the memory card, and the memory card is consequently pushed into the eject connector. When the electrical inspection of the memory card is completed, a button-pushing mechanism operates to push an eject button. As a result, the memory card is elastically projected from the eject connector by an urging mechanism provided in the eject connector.

In the above-described conventional card inspecting apparatus, however, memory cards must be manually placed on the conveyor one by one and must be manually picked up from the conveyor one by one again when the inspection is completed. This results in a problem in that the need for operators' intervention results in a cost increase and in that an idle time of the card assembly apparatus required to rest or replace operators reduces the throughput of card assembly.

The above-described card inspecting apparatus has another problem in that it takes a considerable time to perform an inspection because only one card can be inspected at a time.

Further, while so-called input/output cards (hereinafter called "I/O Cards") such as modem cards, LAN cards, adapter cards for Smart Media, ISDN cards, ATA cards, and so on have a back connector to be connected to a telephone line, a LAN cable or the like in addition to a connector to be connected to a PC, the above-described conventional card inspecting apparatus does not accommodate any electrical inspection on the side of the back connector.

While the eject button of the above-described conventional card inspecting apparatus is pushed to remove a memory card from the eject connector when the electrical inspection is completed, the exterior of the eject button is formed using resin such as plastics which can be broken, and failure is likely to occur in the interior because of wear and the like. Further, since the interface connector of a memory card and the eject connector are mated with a considerably high mating force, the above-described eject button system has a problem in that a card may not be removed.

As described above, the operations of supplying cards to be assembled to the assembly apparatus and collecting assembled cards rely upon operators. Further, the supply and collection of memory cards to and from the card inspecting apparatus also rely upon operators. This results in a problem in that the need for operators' intervention results in a cost increase and in a reduction of the throughput of the card assembly and inspection.

One known way for solving the above-described problems is the use of a magazine for housing a plurality of cards and a mechanical mechanism for picking up cards from the magazine without operators' intervention to perform predetermined processes thereon. For example, Japanese Patent Laid-Open (Kokai) No. H5-46819 discloses a system in which cards are supplied from a magazine located at a card supply port of a card visual inspection apparatus. In this system, when a magazine becomes vacant as all cards therein are supplied, another magazine is moved in turn to the card supply port to start supply of cards therefrom. A card in the magazine is lifted up to an opening of the magazine with appropriate means, and air flows from nozzles blow lateral surfaces of the card to float the card. A picker provided with a vacuum absorption function at an end thereof is then moved into the vicinity of a top surface of the card to absorb and hold the card.

In the case of a conventional magazine as described above, air flows from nozzles blow lateral surfaces of a card to float the card and a picker having a vacuum absorption mechanism at an end thereof is moved into the vicinity of a top surface of the card to absorb, hold and transport the card. Therefore, the magazine must be open on the top side thereof and, when the magazine is dropped by mistake during transportation, the cards are scattered, which results in a potential problem in that the cards themselves are broken in the worst case.

Further, the above-described magazine does not have a configuration which allows a plurality of such magazines to be transported at a time.

Furthermore, since a considerably large die is required for the manufacture of the above-described magazine, there is a problem in that the manufacturing cost of the magazine is high.

SUMMARY OF THE INVENTION

It is an object of the invention to provide a card assembly apparatus which makes it possible to reduce the assembly cost of cards and to improve the throughput of card assembly.

It is another object of the invention to provide card assembly apparatus which makes it possible to perform steps of filling reinforcement resin, inserting an insulation sheet, inserting a cover and thermo-compression bonding continuously.

It is still another object of the invention to provide a card inspecting apparatus which makes it possible to reduce the inspect ion cost of cards and to improve the throughput of card inspection.

It is still another object of the invention to provide a card inspecting apparatus which makes it possible to inspect a plurality of cards at a time.

It is still another object of the invention to provide a card inspecting apparatus which makes it possible to perform an electrical inspection of cards having a back connector even on the side of the back connector.

It is still another object of the invention to provide a card inspecting apparatus to and from which a card can be smoothly inserted and removed at an electrical inspection.

It is still another object of the invention to provide a card magazine which makes it possible to reduce the assembly and inspection costs of cards and which contributes to an improvement of the throughput of card assembly and card inspection.

It is still another object of the invention to provide a card magazine which makes it possible to assemble or inspect a plurality of cards continuously.

The above-described objects are achieved by a card assembly apparatus comprising an assembly process portion for assembling a card by sandwiching a frame for holding a substrate with two shield covers on both sides thereof and bonding them together, and a supply magazine portion for sequentially supplying the frames for holding a substrate to the assembly process portion.

The above-described objects are achieved by a card assembly apparatus comprising an assembly process portion for assembling a card by sandwiching a frame for holding a substrate with two shield covers on both sides thereof and bonding them together, wherein the assembly process portion comprises a resin applying portion for applying resin to the substrate.

A card assembly apparatus according to the above-described aspect of the invention is characterized in that the resin applying portion has switching means to allow positions to apply the resin to be switched.

Further, the above-described objects are achieved by a card assembly apparatus comprising an assembly process portion for assembling a card by sandwiching a frame for holding a substrate with two shield covers on both sides thereof and bonding them together, wherein the assembly process portion comprises a sheet inserting portion for inserting a sheet on to the substrate. A card assembly apparatus according to the above-described aspect of the invention is characterized in that the sheet inserting portion has a sheet cutting die for cutting the sheet and in that the sheet cutting die can be replaced to provide an arbitrary configuration.

Furthermore, the above-described objects are achieved by a card assembly apparatus comprising an assembly process portion for assembling a card by sandwiching a frame for holding a substrate with two shield covers on both sides thereof and bonding them together, wherein the assembly process portion comprises a cover inserting portion for aligning the shield covers to be bonded to the frame for holding the substrate.

A card assembly apparatus according to the above-described aspect of the invention is characterized in that the cover inserting portion has a cover magazine for housing a plurality of shield covers to supply them to the frame sequentially. It is further characterized in that protective materials are interleaved between the plurality of shield covers housed in the cover magazine.

The above-described objects are achieved by a card assembly apparatus comprising an assembly process portion for assembling a card by sandwiching a frame for holding a substrate with two shield covers on both sides thereof and bonding them together, wherein said assembly process portion comprises a top side processing portion for performing assembly on the top side of the frame holding the substrate, a bottom side processing portion for performing assembly on the bottom side of the frame holding the substrate, and an inverting portion provided between the top side processing portion and the bottom side processing portion for inverting the frame holding the substrate.

Furthermore, the above-described objects are achieved by a card assembly apparatus comprising an assembly process portion for assembling a card by sandwiching a frame for holding a substrate with two shield covers on both sides thereof and bonding them together, and a housing magazine portion for housing cards assembled by the assembly process portion sequentially.

The above-described objects are achieved by a card inspecting apparatus characterized in that it has a conveyor for moving a supply magazine loaded with cards containing a substrate incorporating electrical parts and a vacant supply magazine loaded with no such cards which are placed thereon, a card supplying portion for picking up the cards from the supply magazine loaded with the cards, a transport portion for transporting the card pick up by the card supplying portion, an inspecting portion for performing a predetermined electrical inspection on the cards transported by the transport portion and a card housing portion for housing good ones among the cards which have been electrically inspected in the vacant supply magazine.

A card inspecting apparatus according to the above-described aspect of the invention is characterized in that a plurality of the inspecting portions are provided along a transport path of the transport portion. It is also characterized in that the inspecting portion have a plurality of connectors for measurement of a card having a plurality of connectors which are respectively connected to the plurality of connectors. The plurality of connectors for measurement are respectively connected to card-side connectors having an interface with, for example, a PC and to back connectors provided on the opposite side of the same. It is further characterized in that the inspecting portions have an eject mechanism for preventing movement of the connected card when the connectors of the card and the connectors for measurement are disconnected.

In a card inspecting apparatus according to the invention, a plurality of cards can be inserted in the supply magazine and set on the conveyor. When the supply magazine reaches the card supply portion, the cards can be pushed out by a push-out rod provided at the card supply portion into the transport portion sequentially, for example, starting with the card contained in the uppermost stage of the supply magazine. After all of the cards are supplied to the transport portion, the magazine is moved by the conveyor to the card housing portion where it can be then used as a vacant supply magazine for housing good cards which have passed the inspection.

Since a plurality of the inspecting portions are provided, different inspections can be simultaneously carried out on separate items for inspection. For example, in the case of a card for communication, an inspection on the communicating function can be separated from other functional inspections to decrease the inspection time, and a cost advantage can be achieved because there is no need for preparing a plurality of measuring apparatuses having the same function. When the same inspection is carried out at a plurality of inspecting portions, the inspection time can be decreased because a plurality of cards can be inspected simultaneously. Further, since the eject mechanism is provided to prevent movement of connected cards when the connectors of the cards and the connectors for measurement are disconnected, cards can be smoothly inserted to and removed from the connectors for injection at an electrical inspection.

The above-described objects are achieved by a card magazine capable of housing a plurality of cards, characterized in that it has a housing having a general configuration like a rectangular parallelepiped in which a top portion and a bottom portion are secured together through both lateral portions and in which a front portion and a rear portion are open and concave and convex portions provided on the top and bottom portions which engage each other when the housing is stacked with other housings with the opening at the front portion faced vertically upward.

The above-described objects are achieved by a card magazine capable of housing a plurality of cards, characterized in that it has a housing having a general configuration like a rectangular parallelepiped in which a top portion and a bottom portion are secured together through both lateral portions and in which a front portion and a rear portion are open, plates made of a metal provided at the lateral portions and a plurality of side wall portions made of resin secured in parallel to the plates.

A card magazine according to the above-described aspect of the invention is characterized in that it has guide rails formed on card housing sides of the side wall portions and chamfers in a mount-like configuration formed on the guide rails. Further, a card magazine according to the above-described aspect of the invention is characterized in that it has a stopper rod provided at the rear side for positioning cards and a gap for observing cards defined between the lateral portions and the stopper rod.

DESCRIPTION OF THE PREFERRED EMBODIMENTS

[First Embodiment]

Figure 1A:
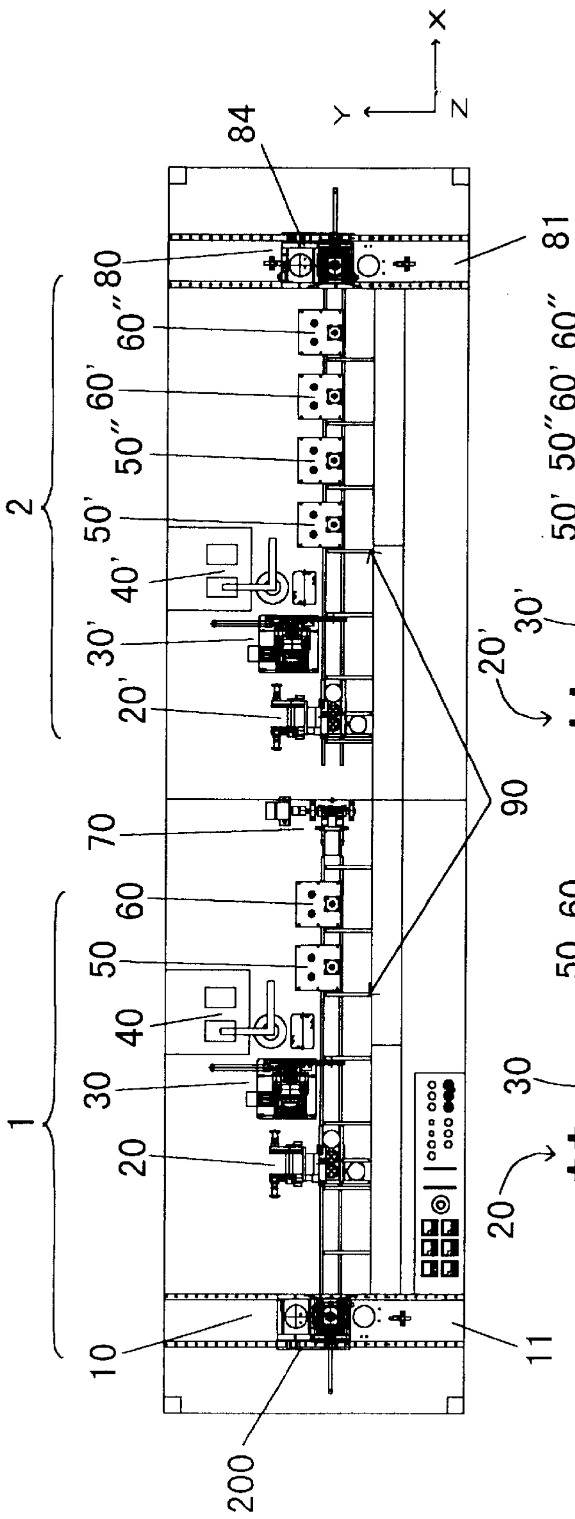
FIGS. 1A and 1B illustrate a schematic configuration of a card assembly apparatus according to a first embodiment of the invention as a whole.
Figure 1B:
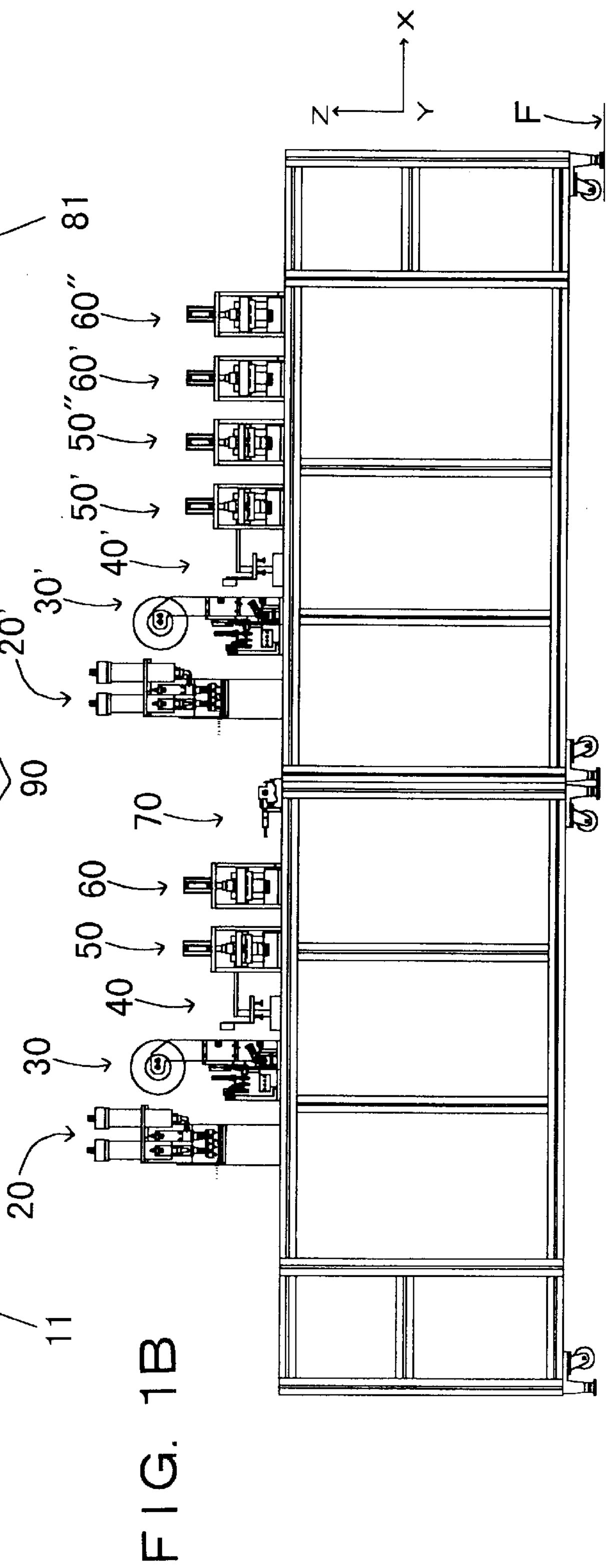

A card assembly apparatus according to a first embodiment of the invention will now be described with reference to FIGS. 1A through 11. A schematic configuration of the card assembly apparatus of the present embodiment as a whole will be first described with reference to FIGS. 1A and 1B. FIG. 1A shows the external appearance of the apparatus as a whole as viewed from above the apparatus, and FIG. 1B shows the external appearance of the apparatus as a whole as viewed from the front side of the apparatus. While the present embodiment will be described with reference to PC cards as an example of cards to be assembled, this card assembly apparatus is not limited to them and may be similarly used for assembly of other cards as described above. In FIGS. 1A and 1B, an X-Y plane is in parallel with a surface F on which the apparatus is placed, and a Z-axis is perpendicular to the X-Y plane.

The configuration of this card assembly apparatus generally consists of a top side processing portion 1 for performing predetermined assembly processes on a top side of a card and a bottom side processing portion 2 for performing predetermined assembly processes on a bottom side of a card. A supply magazine portion 10, a resin applying portion 20, a sheet inserting portion 30, a cover inserting portion 40, a thermo-compression bonding portion 50 and a compression bonding portion 60 are provided in the top side processing portion 1, and a resin applying portion 20', a sheet inserting portion 30', a cover inserting portion 40', thermo-compression bonding portions 50' and 50", compression bonding portions 60' and 60" and a housing magazine portion 80 are provided in the bottom side processing portion 2 where those portions are listed above in the order of their X values increasing in the positive direction. There is also provided a transport portion 90 for transporting PC cards in a path extending from the supply magazine portion 10 to the housing magazine portion 80. The supply magazine portion 10 and housing magazine portion 80 are omitted in FIG. 1B.

PC cards to be assembled in the present embodiment are in compliance with PCMCIA standard and are 85.6 mm long and 54.0 mm wide. Although they are classified into types I, II and III depending on their thickness, any of them is in the form of a card having a thickness of a few millimeters. Such PC cards are assembled into a configuration in which edges of shield covers are inserted and attached to on both sides of an electrical circuit substrate held by a frame. A two-piece connector having 68 pins is provided on a side thereof to be connected to a PC. Some I/O Cards have a back connector with a predetermined number of pins provided at an end thereof on the side opposite to the above-described connector.

Figure 2:
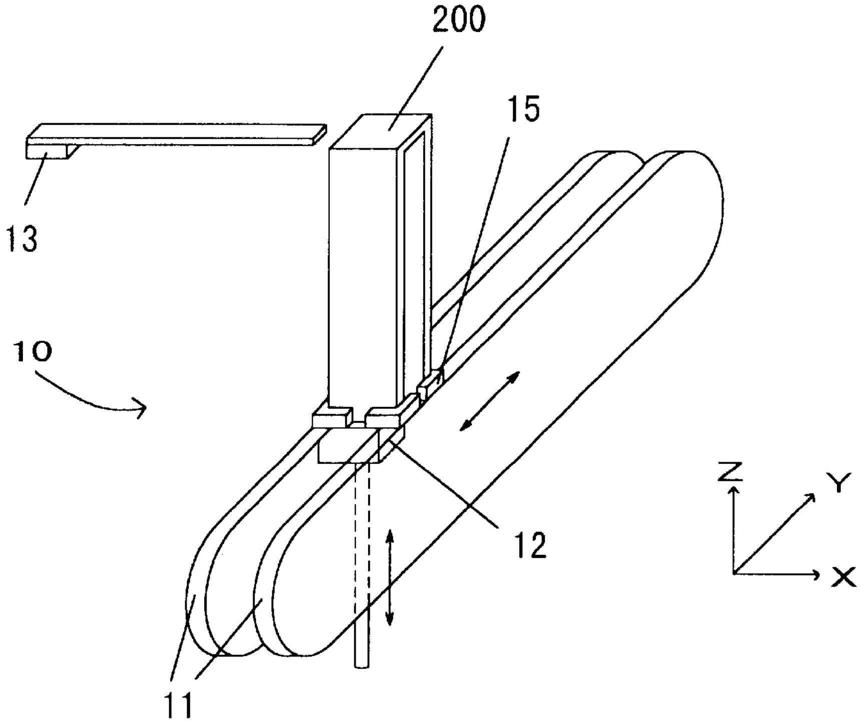
FIG. 2 illustrates a schematic configuration of a supply magazine portion 10 of the card assembly apparatus according to the first embodiment of the invention.

A configuration of the supply magazine portion 10 will be first described with reference to FIG. 2. FIG. 2 is a perspective view of the supply magazine portion showing a conveyor 11, a supply magazine 200 and the neighborhood thereof. A plurality of PC cards in the form of a thin rectangular parallelepiped can be vertically stacked and housed in the supply magazine 200. The supply magazine 200 of the present embodiment is in the form of a rectangular parallelepiped elongate in the Z-direction in which a plurality of housing shelves for holding frames that hold PC card substrates in parallel with the X-Y plane are formed in the Z-direction. Frames holding 50 substrates (or complete PC cards after assembly) can be housed in one supply magazine 200.

Openings into which a push-out rod 13 moving in the X-direction is inserted are provided for respective housing shelves on the side wall of the supply magazine 200 in the negative X-direction thereof. The push-out rod 13 is enabled when the supply magazine 200 placed on the conveyor 11 is stationary on the transport path of the transport portion 90. Openings for moving the frames holding the housed PC card substrates to the transport portion 90 are provided for respective housing shelves on the side wall of the magazine in the positive X-direction thereof in association with the above-described openings.

The supply magazine 200 is secured on the conveyor 11 by a magazine securing portion 15 and is transported thereon. A plurality of supply magazines 200 can be placed on the conveyor 11 and, when one supply magazine 200 becomes empty, the conveyor 11 can be driven to position another supply magazine 200 having frames holding substrates housed therein on the transport path of the transport portion 90. The supply magazine 200 stopped on the transport path of the transport portion 90 can be elevated at a pitch equivalent to the thickness of one PC card by a vertical transport system 12 provided under the magazine securing portion 15. The supply magazine 200 stopped on the transport path of the transport portion 90 is temporarily lowered by the vertical transport system 12 to a lowermost position to allow the frames holding PC card substrates to be sequentially picked up on to the transport path of the transport portion 90 starting with the top frame in the magazine. The frames holding substrates in the supply magazine 200 are pushed out as a result of a movement of the push-out rod 13 provided opposite to the transport path of the transport portion 90 to be moved on to the transport path of the transport portion 90.

Figure 3:
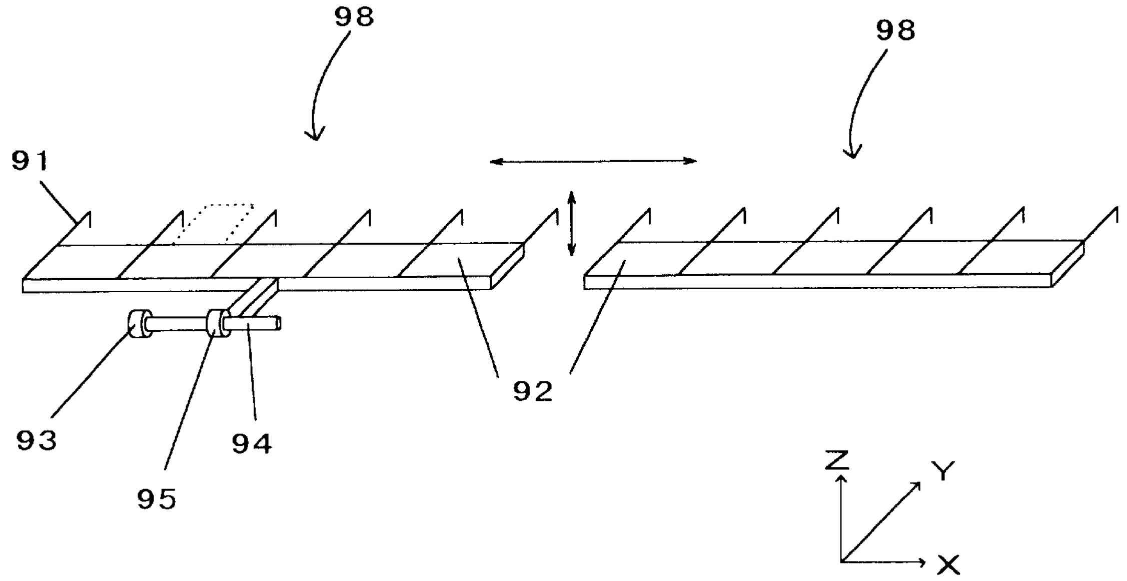
FIG. 3 illustrates a schematic configuration of a transport portion 90 of the card assembly apparatus according to the first embodiment of the invention.

A configuration of the transport portion 90 will now be described with reference to FIG. 3. The transport portion 90 has a transport system for transporting the frames holding PC card substrates (indicated by the broken line) pushed out from the supply magazine 200 by the push-out rod 13 in a predetermined direction. A transport arm 98 of the transport system has a plurality of push-out rods 91 for pushing out the plurality of frames holding substrates in the positive X-direction and a transport block 92 for supporting the push-out rods 91. The transport arm 98 has a moving screw 95 engaged with a ball screw 94, and it can be moved a predetermined distance by rotating the ball screw 94 with a servo motor 93. The frames holding PC card substrates supplied to the main body of the card assembly apparatus are sequentially transported by the transport arm 98 to the next processing portion.

Figure 4:
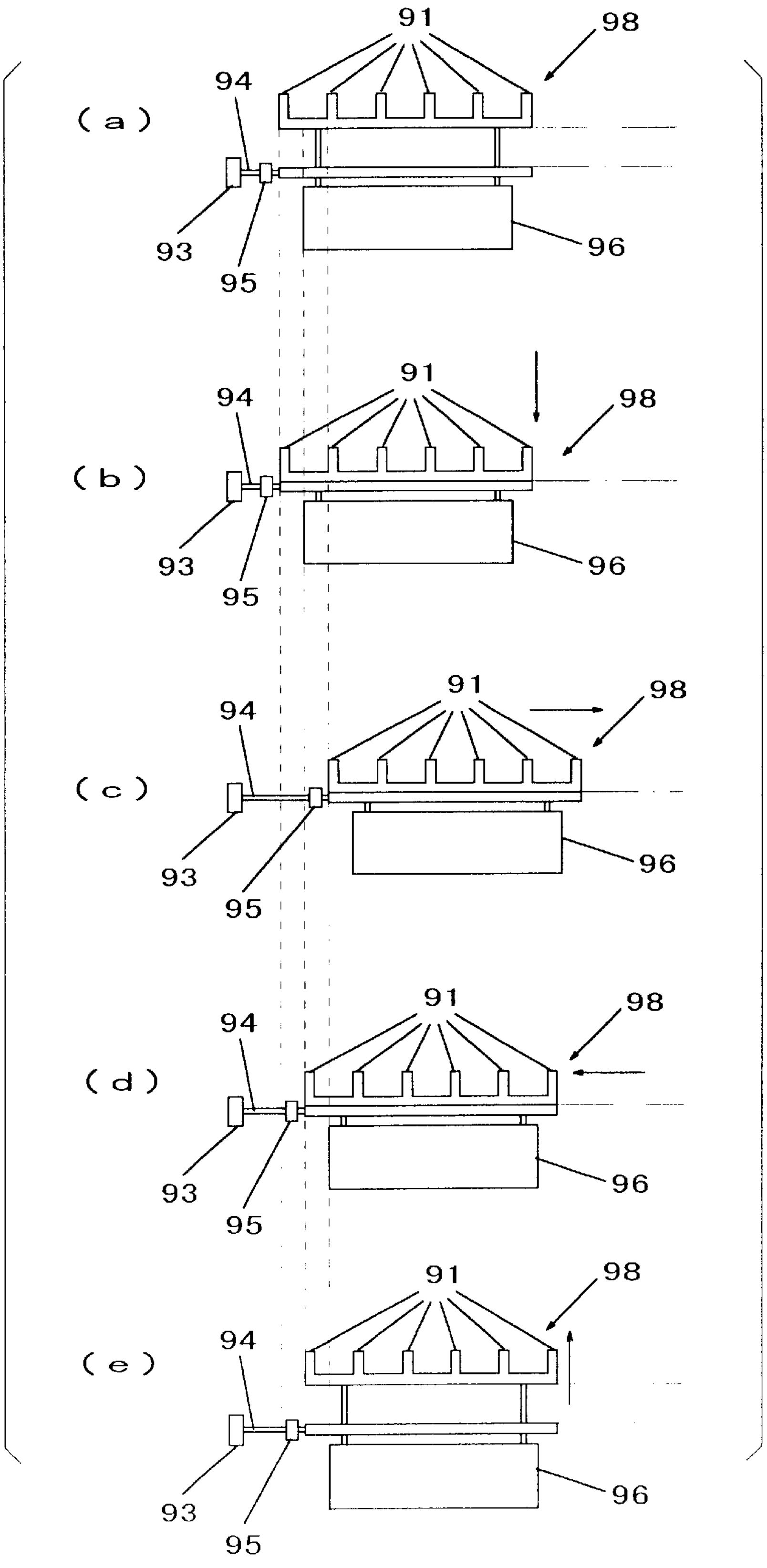
FIG. 4 illustrate an operation of the transport portion 90 of the card assembly apparatus according to the first embodiment of the invention.

An operation of the transport arm 98 will now be described with reference to FIG. 4 in addition to FIG. 3. As shown in FIGS. 3 and 4, the transport arm 98 can be elevated in the Z-direction by a lifter 96. The transport arm 98 is initially stationed at an elevated position as shown in FIG. 4(*a*). The frames holding substrates are moved by driving the lifter 96 to lower the push-out rods 91 in this state which is referred to as "home position" here as shown in FIG. 4(*b*). Then, as shown in FIG. 4(*c*), the servo motor 93 is driven to rotate the ball screw 94 which in turn feeds the transport arm 98 in a predetermined amount in the positive X-direction and, as a result, the frames holding substrates are fed by the push-out rods 91 to the center of respective processing portions. Then, in order to prevent the push-out rods 91 from hindering the process in each of the processing portions, as shown in FIG. 4(*d*), the servo motor 93 is driven to reverse the ball screw 94, thereby returning the transport arm 98 in a predetermined amount in the negative X-direction. As shown in FIG. 4(*e*), the transport arm 98 is elevated by the lifter 96 until the push-out rods 91 comes to a position higher than the surface of the transport path and, when the process in each of the processing portions is terminated, the servo motor 93 is driven to reverse the ball screw 94 by a predetermined number of revolutions, which returns the transport arm 98 in the X-direction to the initial position or home position (FIG. 4(*a*)). By repeating this operation, frames holding a plurality of substrates or PC cards on the transport path can be simultaneously moved in the positive X-direction in a predetermined amount.

The frames holding substrate sequentially pushed out from the supply magazine 200 on to the transport path of the transport portion 90 are sequentially moved by the transport arm 98 of the transport portion 90 which performs the above-described transport operation to be assembled through the following processing steps.

First, the PC card substrates are transported with the top side thereof facing upward to the resin applying portion 20, sheet inserting portion 30, cover inserting portion 40, thermo-compression bonding portion 50 and compression bonding portion 60 sequentially. Then, the frames holding the substrates to which a top side shield cover has been bonded are inverted by the inverting portion 70 and are subjected to steps similar to those performed on the top side to carry out a bottom side process on the frames holding the substrates. The bottom side process on the frames holding the substrates involves operations at steps sequentially performed at the resin applying portion 20', sheet inserting portion 30', cover inserting portion 40', thermo-compression bonding portions 50' and 50" and compression bonding portions 60' and 60". Those processing portions will be described later.

Figure 5:
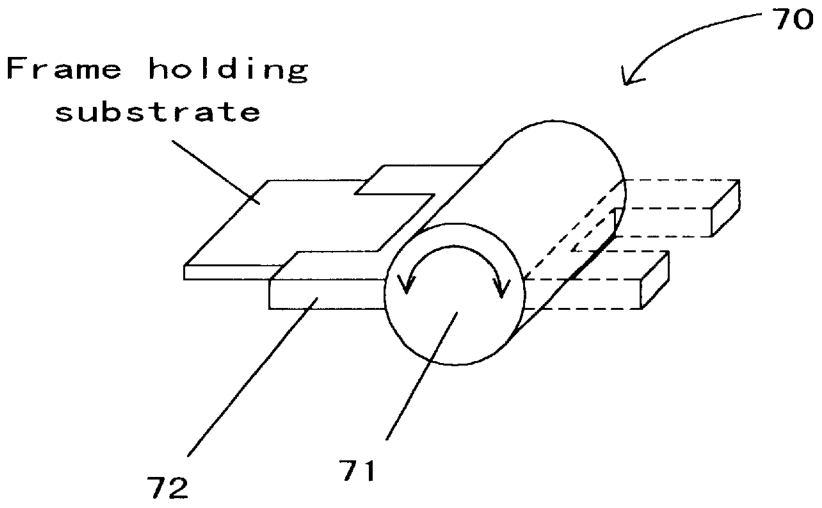
FIG. 5 illustrates a schematic configuration of an inverting portion 70 of the card assembly apparatus according to the first embodiment of the invention.

FIG. 5 illustrates a schematic configuration of the inverting portion 70. When a frame holding a substrate to which a top side shield cover has been bonded is inserted into a receptacle 72 of the inverting portion 70, an inverting drum 71 rotates to invert the receptacle 72 to the position indicated by the broken line in FIG. 5 to transfer the same frame holding the substrate from the top side processing portion 1 to the bottom side processing portion 2.

Figure 6:
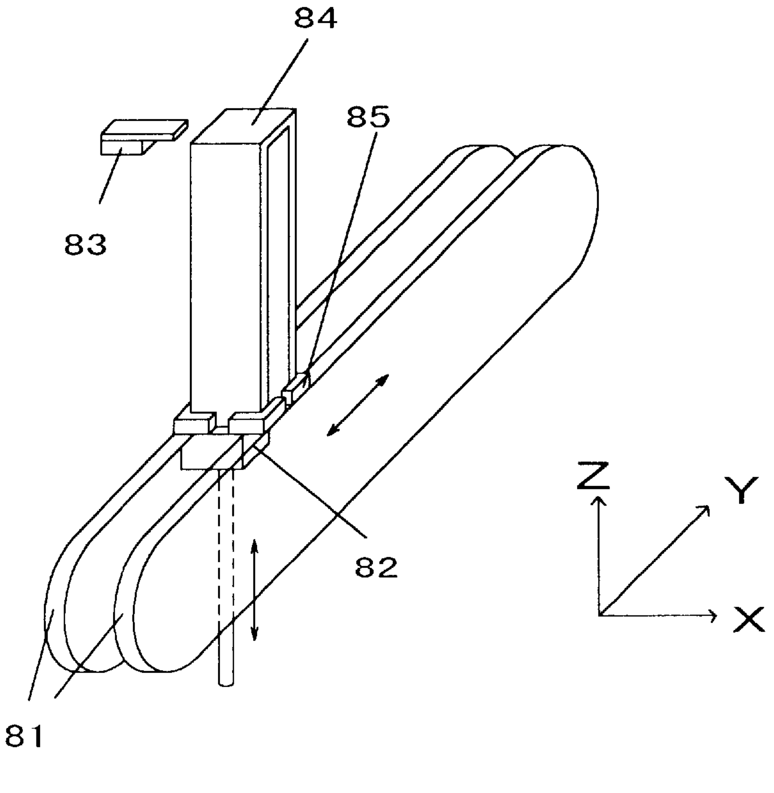
FIG. 6 illustrates a schematic configuration of a housing magazine portion 80 of the card assembly apparatus according to the first embodiment of the invention.

A configuration of the housing magazine portion 80 will now be described with reference to FIG. 6. FIG. 6 is a perspective view the housing magazine portion 80 showing a conveyor 81, a housing magazine 84 and the neighborhood of them. The housing magazine 84 has completely the same structure as that of the supply magazine 200 and can provide the same functions. Since the housing magazine 84 and supply magazine 200 are substantially identical, the housing magazine 84 may be used in the supply magazine portion 10, and the supply magazine 200 may be used in the housing magazine portion 80.

A push-out rod 83 for moving PC cards in the X-direction is inserted in openings on the side wall in the negative X-direction of the housing magazine 84 placed on the conveyor 81 and stopped on the transport path of the transport portion 90 to store assembled PC cards.

The housing magazine 84 is secured on the conveyor 81 by a magazine securing portion 85 and is transported thereon in the Y-direction. A plurality of housing magazines 84 can be placed on the conveyor 81 and, when a PC card is housed in each housing shelf in one housing magazine 84, the conveyor 81 can be driven to position a vacant housing magazine 84 on the transport path of the transport portion 90. The housing magazine 84 stopped on the transport path of the transport portion 90 can be elevated at a pitch equivalent to the thickness of one PC card by a vertical transport system 82 provided under the conveyor 81. The housing magazine 84 stopped on the transport path of the transport portion 90 is temporarily elevated by the vertical transport system 82 to an uppermost position to sequentially place assembled PC cards in the magazine starting with the vacant housing shelf at the bottom thereof.

A structure of each of the processing portions of the apparatus may body will now be described with reference to FIGS. 7 through 11.

Figure 7:
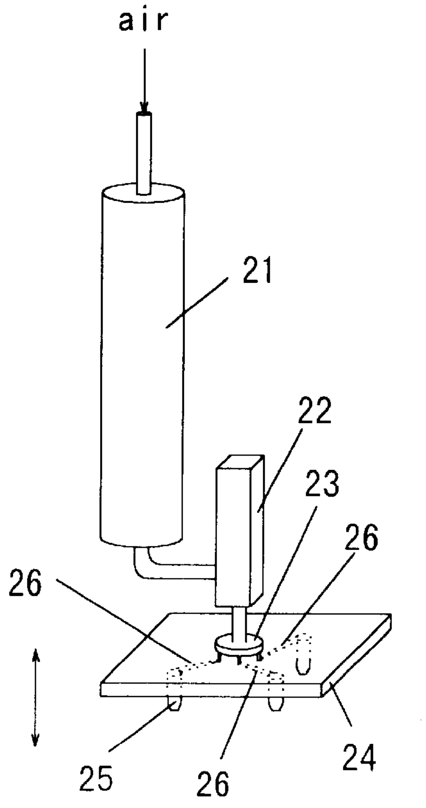
FIG. 7 illustrates a schematic configuration of a resin applying portion 20 of the card assembly apparatus according to the first embodiment of the invention.

FIG. 7 is a perspective view of the resin applying portion 20 shown in FIG. 1. The resin applying portion 20 has a resin cartridge 21 which is a hollow cylindrical member whose center axis extends in the Z-direction and which contains resin. An air inlet port for applying an air pressure to the contained resin is provided on the upper end of the cylindrical configuration of the resin cartridge 21. A transport pipe for transporting the resin is provided on the lower end of the cylindrical configuration, and the pipe is connected to a dispenser 22. A shower needle 23 is provided on the bottom of the dispenser 22 to branch the resin which has reached the dispenser 22 into a plurality of channels.

The resin channels as a result of branching at the shower needle 23 are connected to one or a plurality of grooves 26 formed on a special nozzle plate 24 such that the resin is applied to predetermined positions on PC card substrates. Nozzles 25 are mounted at the ends of the grooves 26 formed on the special nozzle plate 24. With the resin applying portion 20 having such a configuration, a predetermined amount of resin can be applied to predetermined positions of PC card substrates by opening and closing a valve (not shown) of the dispenser 22.

By changing the courses of the grooves 26 formed on the special nozzle plate 24, reinforcement resin can be applied to arbitrary positions on PC card substrates. Therefore, if several types of special nozzle plates 24 are provided in advance in accordance with the dimensions of various cards and the modes of disposal of elements on substrates, it is possible to change desired positions to apply reinforcement resin quickly only by replacing the special nozzle plate 24 depending on the cards. Thus, the special nozzle plate 24 provides switching means for switching positions to apply resin.

Figure 8:
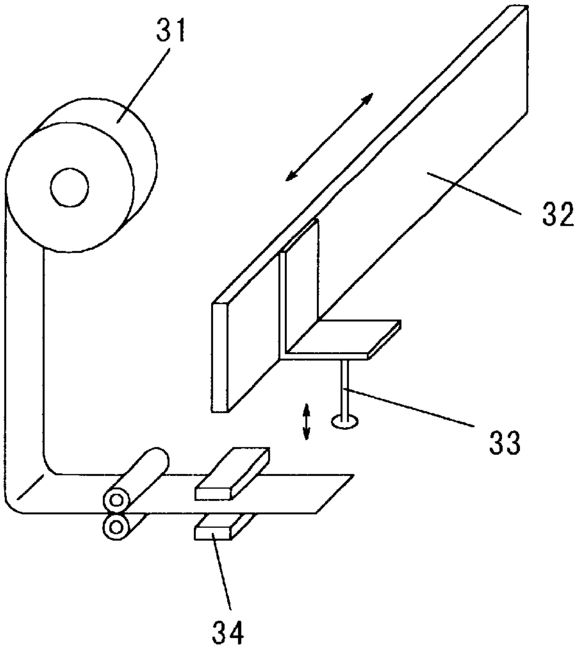
FIG. 8 illustrates a schematic configuration of a sheet inserting portion 30 of the card assembly apparatus according to the first embodiment of the invention.

FIG. 8 is a perspective view of the sheet inserting portion 30 shown in FIG. 1. The sheet inserting portion 30 has a sheet cutting die 34 for cutting an insulating sheet material pulled out from a roll 31 wound with a predetermined width into a predetermined length or a predetermined configuration. A sheet cut by the sheet cutting die 34 is absorbed and held by a sheet absorbing portion 33 having a very weak vacuum absorption mechanism. The sheet absorbing portion 33 is held by a sheet transport portion 32 and can be moved with the sheet transport portion 32 to insert a sheet absorbed and held thereby into a PC card substrate stopped on the transport portion 90. When the absorption of the sheet absorbing portion 33 is terminated, the sheet is placed on the PC card substrate. The length of the sheet can be arbitrarily changed by adjusting the detecting position of a sensor which is not shown. Further, since the configuration of the sheet cutting die 34 can be changed, sheets cut in arbitrary configurations can be easily obtained.

Figure 9:
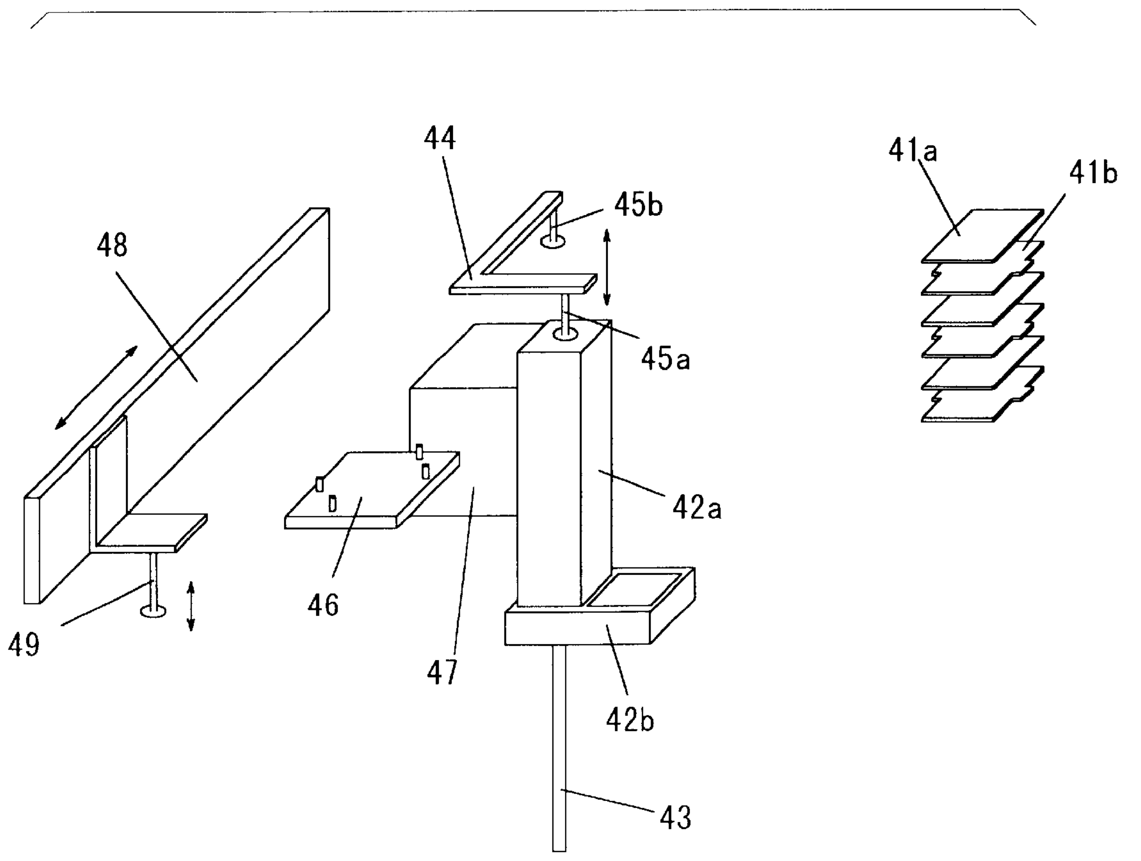
FIG. 9 illustrates a schematic configuration of a cover inserting portion 40 of the card assembly apparatus according to the first embodiment of the invention.

FIG. 9 is a perspective view of the cover inserting portion 40 shown in FIG. 1. Shield covers 41*a* and protective materials 41*b* are alternately stacked and housed in a cover magazine 42*a*. The protective materials 41*b* are inserted between the shield covers 41*a* in order to protect the shield covers 41*a* against bending and damage attributable to contact between them. The cover magazine 42*a* is housed in a cover magazine housing portion 42*b* and has an opening at the top thereof. The shield covers 41*a* and protective materials 41*b* can be alternately taken out through the opening. A magazine pick-up arm 44 has two arms which are substantially orthogonal to each other in the X-Y plane and can rotate in the X-Y plane about the intersection between the two arms. The tow arms of the magazine pick-up arm 44 can be simultaneously moved in the Z-direction.

A protective material absorb/pick-up portion 45*b* for absorbing and holding the protective materials 41*b* through the opening on the top of the cover magazine 42*a* is attached to one of the arms, and a shield cover absorb/pick-up portion 45*a* for absorbing and holding the shield covers 41*a* through the opening on the top of the cover magazine 42*a* is attached to the other arm. When the magazine pick-up arm 44 is driven to lower the shield cover absorb/pick-up portion 45*a* to the cover magazine 42*a*, the shield cover absorb/pick up portion 45*a* absorbs and holds a shield cover 41*a* and then moves upward. Thereafter, the magazine pick-up arm 44 rotates about a Z-axis to move the shield cover absorb/pick-up portion 45*a* to a positioning stage 46.

At this time, the protective material absorb/pick-up portion 45*b* is located above the cover magazine 42*a*. The protective material absorb/pick-up portion 45*b* absorbs and holds a protective material 41*b* at the same time when the magazine pick-up arm 44 moves downward, places the shield cover 41*a* on the positioning stage 46 and stops absorption. When the magazine pick-up arm 44 moves upward and rotates about the Z-axis to return to the initial position, the protective material absorb/pick-up portion 45*b* places the protective material 41*b* absorbed and held thereby in a protective material housing portion 47 and stops absorption. Such a series of operations of the magazine pick-up arm 44 complete the placement of a shield cover 41*a* on the positioning stage 46 and places a protective material 41*b* in the protective material housing portion 47.

Each time a shield cover 41*a* and a protective material 41*b* in the cover magazine 42*a* are picked up by the magazine pick-up arm 44, a vertical transport system 43 moves upward to elevate the remaining shield covers 41*a* and protective materials 41*b*. Therefore, the magazine pick-up arm 44 can pick up the shield covers 41*a* and protective materials 41*b* in the cover magazine 42*a* by repeating a movement in a predetermined amount in the Z-direction.

The positioning stage 46 accurately positions a shield cover 41*a* placed thereon relative to a frame holding a substrate which has been stopped on the transport portion 90. When the positioning of the frame holding a substrate is completed, a shield cover transport portion 48 and a shield cover absorb/transport portion 49 attached to the same are moved to absorb and hold the shield cover 41*a* on the positioning stage 46. Then, the shield cover 41*a* is moved on to the frame holding a substrate stopped on the transport portion 90; absorption is stopped; and an edge of the shield cover 41*a* is inserted into a recess of the frame holding a substrate. This completes the steps of applying reinforcement resin to a substrate held by a frame, inserting a sheet and covering those elements with a shield cover 41*a*.

Figure 10:
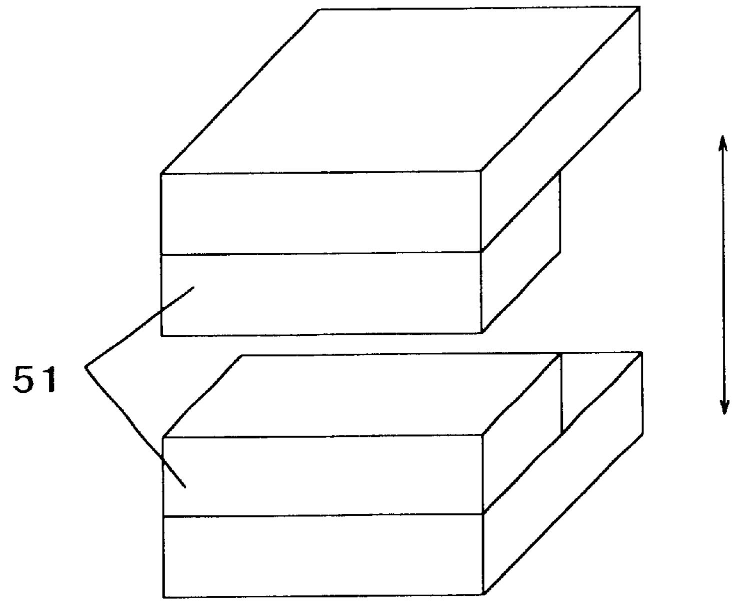
FIG. 10 illustrates a schematic configuration of a thermo-compression bonding portion 50 of the card assembly apparatus according to the first embodiment of the invention.

FIG. 10 is a perspective view of the thermo-compression bonding portion 50 shown in FIG. 1. In the thermo-compression bonding portion 50, heater blocks 51 are moved upward and downward to soften glue applied in advance to at least a surface of the shield cover 41*a* to contact with a frame. When the above-described steps up to the fitting of the shield cover 41*a* is completed, the frame holding the substrate is moved by the transport portion 90 to the thermo-compression bonding portion 50 and is heated by the heater blocks 51 on both sides thereof with an appropriate pressure, which softens the glue applied to the shield cover 41*a*.

Figure 11:
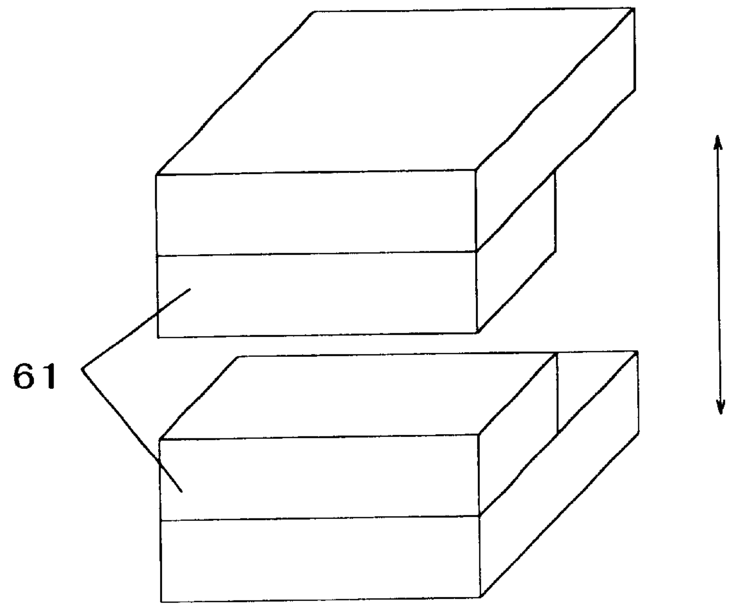
FIG. 11 illustrates a schematic configuration of a compression bonding portion 60 of the card assembly apparatus according to the first embodiment of the invention.

FIG. 11 is a perspective view of a compression bonding portion 60 shown in FIG. 1. In the compression bonding portion 60, the frame holding the substrate on which the glue has been softened by the thermo-compression bonding portion 50 is inserted between compression bonding blocks 61 to press and cool the glue with the blocks 61, which hardens the glue to achieve compression bonding.

This terminates the assembly step for bonding a shield cover 41*a* to a frame on the top side thereof at the top side processing portion 1. Then, the frame holding a substrate is inverted by the inverting portion 70 which has already been described and is transferred to the bottom side processing portion 2. The frame is passed through the resin applying portion 20', sheet inserting portion 30', cover inserting portion 40', thermo-compression bonding portions 50' and 50" and compression bonding portions 60' and 60" to perform the application of reinforcement resin, sheet insertion, and compression bonding of a shield cover also on the bottom side of the frame holding a substrate, which complete a PC card. The processes in the bottom side processing portion 2 will not be described here because they are similar to the processes in the top side processing portion 1. In the bottom side processing portion 2, the thermo-compression bonding portions 50' and 50" and the compression bonding portions 60' and 60" perform the same processes twice. The purpose is to ensure the bonding between the frame and the shield covers 41*a* sandwiching the same on both sides thereof at the final stage of assembly.

The assembled PC card is housed in the housing magazine 84.

As described above, the present embodiment makes it possible to apply a predetermined amount of resin to predetermined positions of a substrate. Since it is easy to change the positions where the grooves 26 of the special nozzle plate 24 are formed, the positions to apply resin can be changed depending on the design.

With the above-described configuration, an insulating sheet in the form of a roll can be cut into any length to be inserted into a PC card. The configuration to be cut can be arbitrarily changed by replacing the cutting die.

Further, the above-described configuration eliminates a need for manually inserting a shield cover 41*a* into a frame holding a substrate, which makes it possible to improve the throughput of assembly. Furthermore, since the above-described configuration makes it possible to set a plurality of supply magazines 200 and housing magazines 84 on the conveyor 11 and conveyor 81 respectively, operation efficiency can be significantly improved.

As described above, the present embodiment makes it possible to reduce costs required for card assembly and to improve the throughput of card assembly. The present embodiment also makes it possible to perform the steps of filling reinforcement resin, inserting insulating sheets, inserting covers and performing thermo-compression bonding of the same continuously.

[Second Embodiment]

Figure 12A:
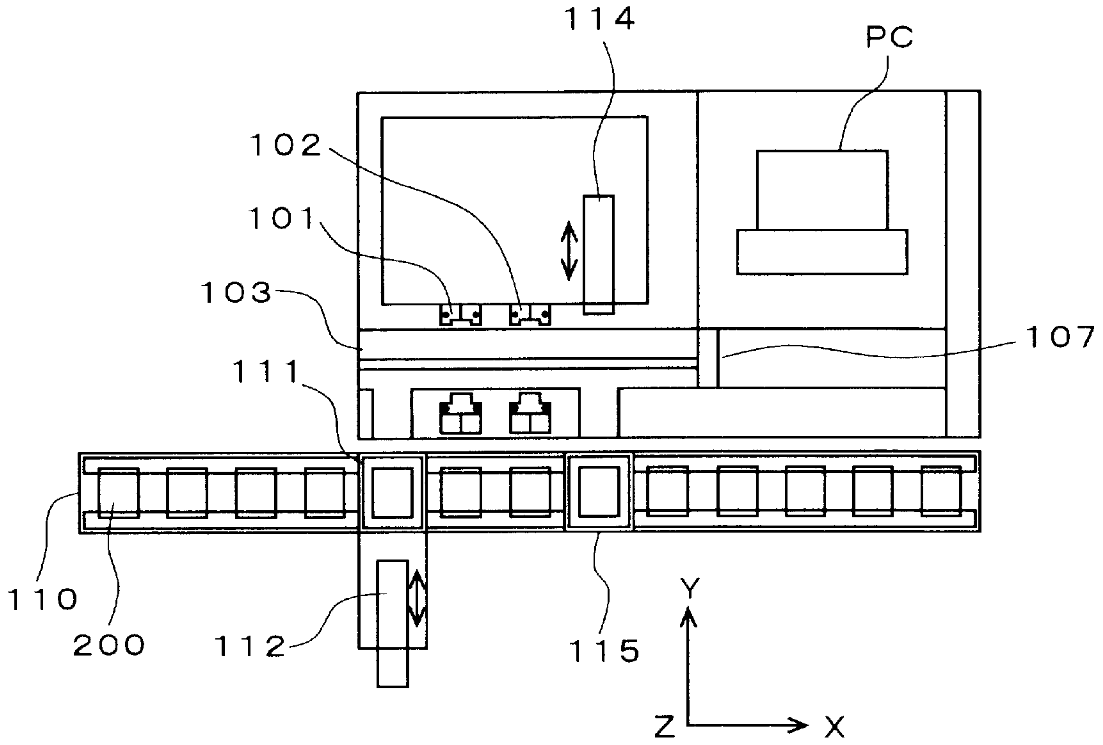
FIGS. 12A and 12B illustrate a schematic configuration of a card inspecting apparatus according to a second embodiment of the invention as a whole.
Figure 12B:
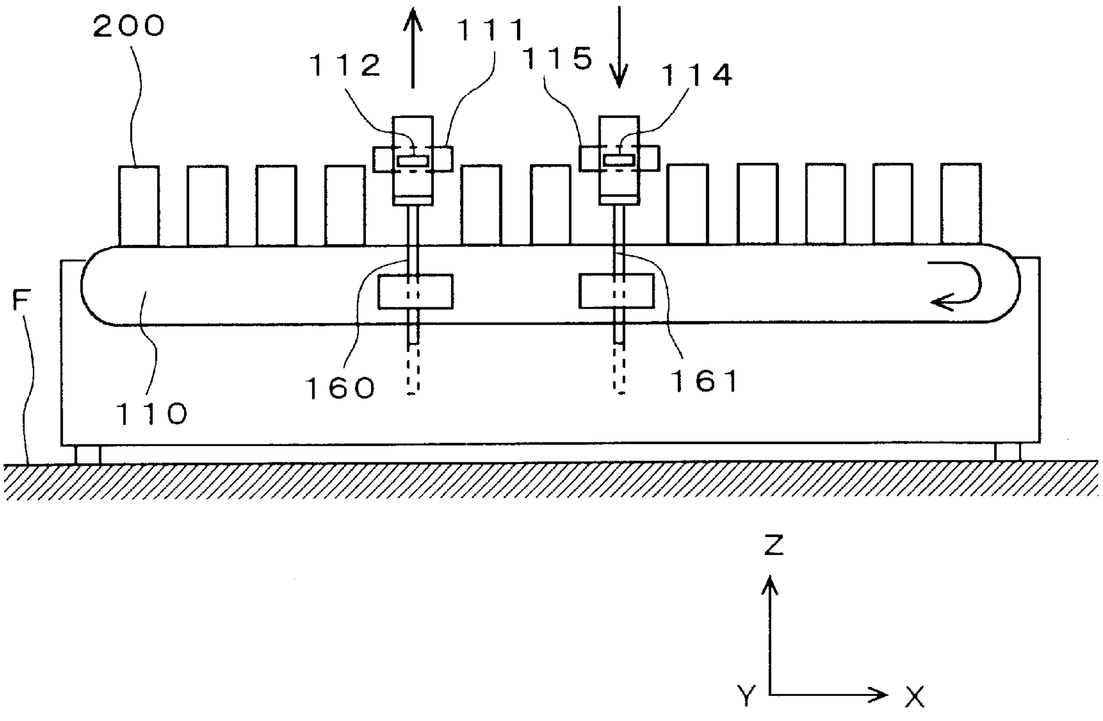
Figure 13:
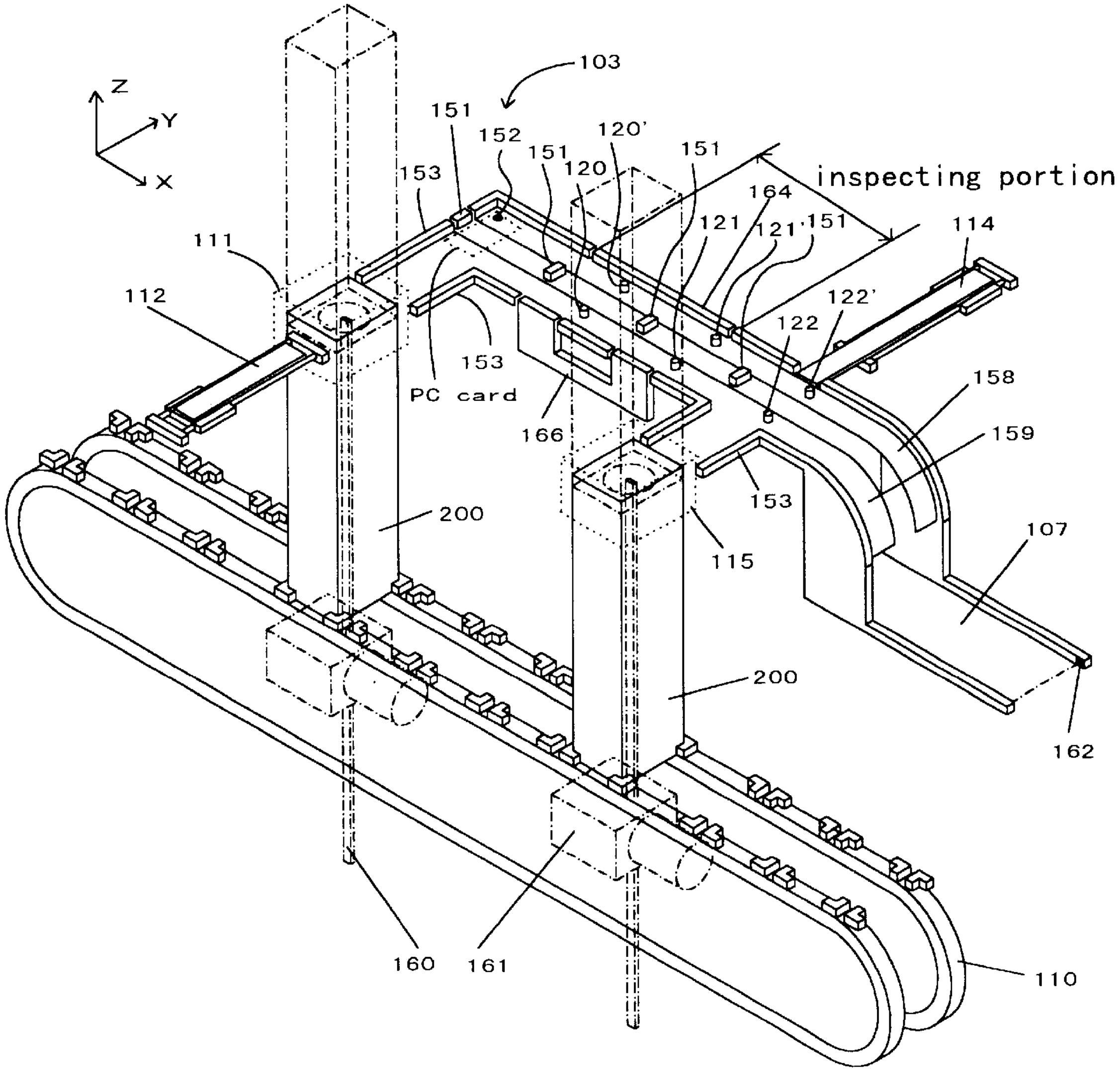
FIG. 13 primarily illustrates a schematic configuration of a conveyor 110, a supply magazine 200 and a transport portion 103 of the card inspecting apparatus according to the second embodiment of the invention.

A card inspecting apparatus according to a second embodiment of the invention will now be described with reference to FIGS. 12A through 18. A schematic configuration of the card inspecting apparatus of the present embodiment as a whole will be first described with reference to FIGS. 12A, 12B and 13. FIG. 12A shows the external appearance of the apparatus as a whole as viewed from above the apparatus, and FIG. 12B primarily shows a conveyor 110 and a supply magazine 200 as viewed from the font side of the apparatus. FIG. 13 is a perspective view primarily showing configurations of the conveyor 110, the supply magazine 200 and a transport portion 103. While the present embodiment will be described with reference to PC cards as an example of cards to be inspected, this card inspecting apparatus is not limited to them and may be similarly used for cards other than those as described above.

The configuration of this card inspecting apparatus generally consists of a conveyer 110 for transporting a supply magazine 200 containing a plurality of PC cards, a transport portion 103 for transporting PC cards supplied from a card supply portion 111 to an inspecting portion 101 one by one, the inspecting portion 101 and an inspecting portion 102 for performing electrical inspections on the PC cards and a defective cards discharge portion 107 for housing PC cards judged to be defective. In FIGS. 12A and 12B, an X-Y plane is in parallel with a surface F on which the apparatus is placed, and a Z-axis is perpendicular to the X-Y plane. The X-axis corresponds to the direction in which the conveyor 110 transports the supply magazine 200, and the Y-axis is orthogonal to the X-axis.

PC cards described as an example of objects to be inspected in the present embodiment are cards in compliance with PCMCIA standard similar to those described in the first embodiment. Such a PC card is an electrical circuit substrate which is held on a frame and to which shield covers are attached on both sides thereof. A two-piece connector having 68 pins is provided on a side thereof to be connected to a PC, and a back connector with a predetermined number of pins is attached to an end thereof on the side opposite to the above-described connector.

The supply magazine 200 is in the form of a rectangular parallelepiped elongate in the Z-direction in which a plurality of housing shelves for holding PC cards such that the shield covers of the PC cards are in parallel with the X-Y plane are formed in the Z-direction. 50 PC cards can be housed in one supply magazine 200.

Openings into which a push-out rod 112 movable in the Y-direction provided at the card supply portion 111 is inserted are provided for respective housing shelves on the side wall of the supply magazine 200 in the negative Y-direction thereof. Openings for moving contained PC cards to the transport portion 103 are provided for respective housing shelves on the sidewall of the magazine in the positive Y-direction thereof in association with the above-described openings.

As shown in FIGS. 12A and 12B, in the present embodiment, four supply magazines 200 can be placed on the convey or 110 on the left side of the card supply portion 111. The surface of the conveyor 110 on which supply magazines 200 are placed can be moved in the positive X-direction to move the supply magazines 200 to the card supply portion 111 sequentially. A card housing portion 115 is provided on the side of the card supply portion 111 in the positive X-direction thereof to house good PC cards that have passed inspections at the inspecting portions 101 and 102 in a vacant supply magazine 200. When a supply magazine 200 is moved to the card supply portion 111, the push-out rod 112 provided at the card supply portion 111 sequentially pushes out the PC cards housed in the supply magazine 200 in the positive Y-direction starting with the uppermost card to feed them to the transport portion 103.

Lifters 160 and 161 are respectively provided under the card supply portion 111 and card housing portion 115 to elevate supply magazines 200 placed on the conveyor 110 in the Z-direction. A supply magazine 200 at the card supply portion 111 is sequentially elevated by the lifter 160, and the push-out rod 112 is moved in the Y-direction accordingly to push out the PC cards in the housing shelves thereof, which allows the PC cards to be supplied to the transport portion 103 one by one. Meanwhile, the lifter 161 sequentially lowers a vacant supply magazine 200 at the card housing portion 115, and a second push-out rod 114 is moved in the Y-direction accordingly to push out good PC cards on which the inspections have been completed, which allows the PC cards to be sequentially housed in vacant housing shelves of the supply magazine 200.

When all of the cards contained in the supply magazine 200 at the card supply portion 111 are ejected, the conveyor 110 moves in the positive X-direction to set the next supply magazine 200 at the card supply portion 111. The supply magazine 200 that has thus become empty is thereafter used at the card housing portion 115 to store good PC cards. As the conveyor 110 moves, the supply magazine 200 in which good PC cards have been housed at the card housing portion 115 is also moved to be collected thereafter.

As shown in FIG. 13, the transport portion 103 is provided with a guide 153 and transport rails 158 and 159 for guiding PC cards (indicated by the broken line) pushed out from the supply magazine 200 by the push-out rod 112 in a predetermined direction. The transport portion 103 is also provided with a card detecting sensor 152 for detecting the PC cards pushed out by the push-out rod 112. Between the transport rails 158 and 159 of the transport portion 103, there is provided a positioning/holding portion 150 which is moved in the X-direction with the detected PC cards placed thereon.

Figure 14:
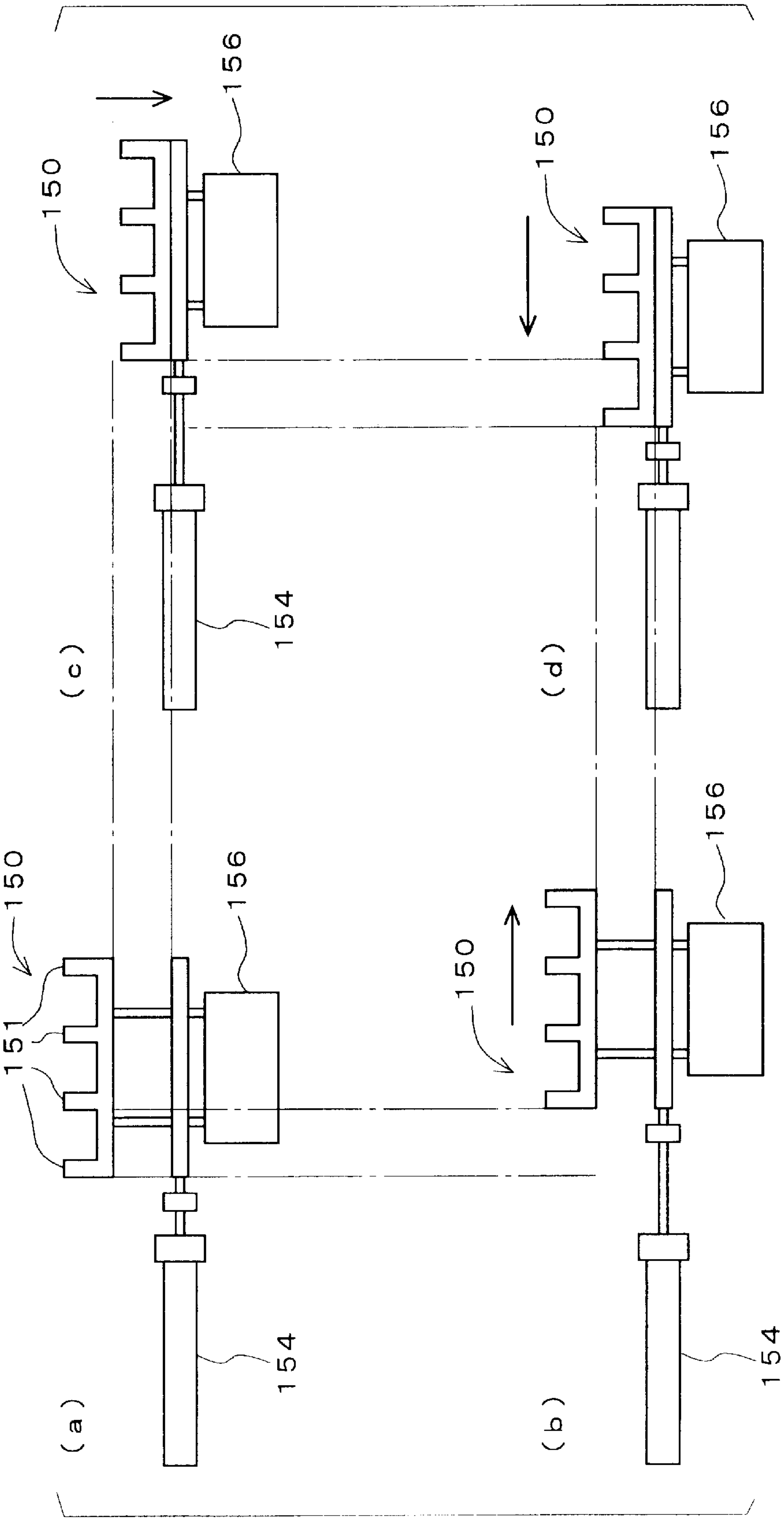
FIG. 14 illustrate a schematic configuration and an operation of a positioning/holding portion 150 of the card inspecting apparatus according to the second embodiment of the invention.

A configuration and an operation of the positioning/holding portion 150 will now be described with reference to FIGS. 13 and 14. As shown in FIGS. 13 and 14, the positioning/holding portion 150 has four projections 151 formed on a substrate thereof which extends in the X-direction. The substrate can be elevated by a lifter 156 in the Z-direction. The substrate can be also moved in the X-direction in a predetermined amount by a cylinder 154.

Therefore, if the state shown in FIG. 14(*a*) is defined as "home position", a piston of the cylinder 154 is pushed out to feed the positioning/holding portion 150 in the positive X-direction in a predetermined amount (FIG. 14(*b*)); the lifter 156 lowers the positioning/holding portion 150 until the projections 151 thereof comes to a position lower than the surfaces of the transport rails 158 and 159 of the transport portion 103 (FIG. 14(*c*)); the piston of the cylinder 154 is then returned in the negative X-direction in a predetermined amount to return the positioning/holding portion 150 in the X-direction to the initial position (FIG. 14(*d*)); and the lifter 156 then returns the positioning/holding portion 150 to the home position by elevating it until the substrate surface thereof comes to a position substantially flush with the surfaces of the transport rails 158 and 159 of the transport portion 103 (FIG. 14(*a*)). Four PC cards on the transport portion 103 can be simultaneously moved in a predetermined amount in the X-direction by repeating such an operation.

Positioning pins 120 and 120' for positioning PC cards are provided on the transport rails 158 and 159 in the vicinity of the inspecting portion 101 such that they can be elevated relative to rail surfaces of the transport rails 158 and 159. Similarly, positioning pins 121 and 121' are provided in the vicinity of the inspecting portion 102, positioning pins 122 and 122' are provided in the vicinity of the moving path of the second push-out rod 114.

The ends of the transport rails 158 and 159 in the positive X-direction thereof are sloped to discharge PC cards determined as defective at the inspecting portions 101 and 102. A full charge sensor 162 is attached to a defective cards discharge portion 107 for detecting when the discharge portion 107 is filled by cards.

A guide 164 in the vicinity of the inspecting portions 101 and 102 can be elevated relative to the rail surfaces of the transport rails 158 and 159. A guide 166 located opposite to the guide 164 across the transport rails 158 and 159 can be also elevated.

Figure 15:
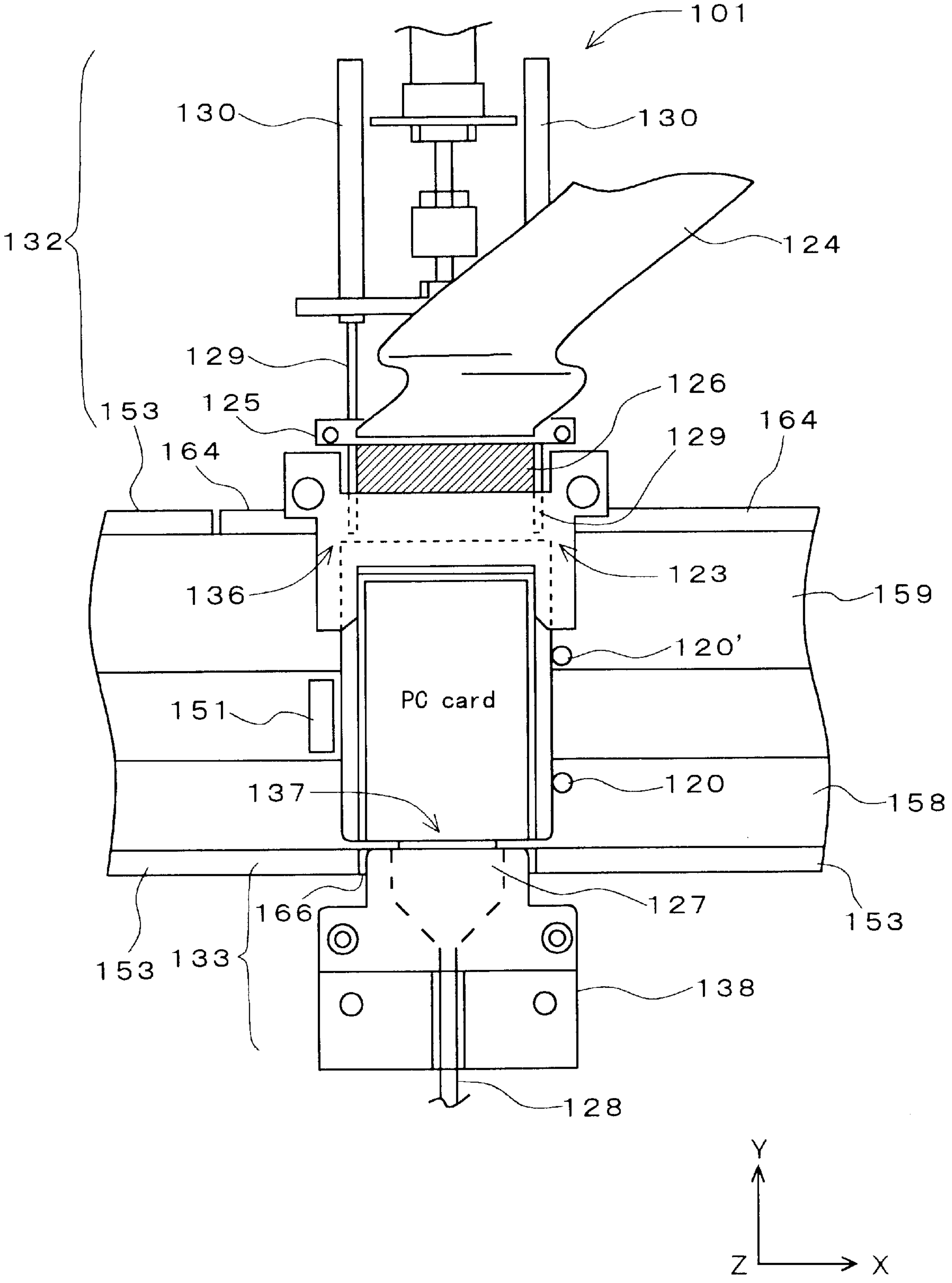
FIG. 15 illustrates a schematic configuration of an inspecting portion of the card inspecting apparatus according to the second embodiment of the invention.

A configuration of the inspecting portions 101 and 102 will now be described with reference to FIG. 15. The inspecting portions 101 and 102 has the same basic configuration, and FIG. 15 therefore illustrates the inspecting portion 101 as an representative of them. A PC card moved by a push of a projection 151 as a result of a movement of the positioning/holding portion 150 of the transport portion 103 is positioned at an inspecting position by the positioning pins 120 and 120' erected on the transport rails 158 and 159 and the projection 151 of the positioning/holding portion 150. When the PC card is positioned, the guides 164 and 166 are lowered to cause a PCMCIA connector-side inspecting system 132 and a back connector-side inspecting system 133 of the inspecting portion 101 to enter the transport portion 103. FIG. 15 illustrates a state in which a PC card moved to the inspecting portion 101 has been positioned by the positioning pins 120 and 120' and the like; the PCMCIA connector-side inspecting system 132 has been moved in the negative Y-direction into contact with a connector 136 of the PC card; and the back connector-side inspecting system 133 has been moved in the positive Y-direction to be connected to a back connector 137.

The PCMCIA connector-side inspecting system 132 has a card slot portion 123 and eject mechanisms 130. The card slot portion 123 contains a part of the side of the PC card where the connector 136 is located and has a connector for measurement (not shown) which is electrically connected to each pin of the connector 136 of the PC card. In order to suppress the influence of noises, an interface board 126 and an interface cable 124 are attached to the card slot portion 123. The interface board 126 performs transfer of PC card inspection signals to and from a measuring device (not shown) through a relaying connector 125 and the interface cable 124.

The back connector-side inspecting system 133 has a back connector 127 for measurement and a measurement cable 128 connected thereto. They are housed in a back connector cover 138. The back connector 127 for measurement can be replaced in accordance with types of so-called I/O Cards such as modem cards, LAN cards, ISDN cards, and so on. The measurement cable 128 formed integrally with the back connector 127 for measurement is connected to a measuring device for communication (not shown).

During an electrical test, the back connector cover 138 can be moved by a driving system which is not shown in the positive Y-direction to exert an urging force to establish electrical connection between the back connector 137 and the back connector 127 for measurement of a PC card and electrical connection between the connector 136 and the connector in the card slot portion 123.

An inspecting portion 102 having a configuration similar to that of the inspecting portion 101 described above is provided along the transport rails 158 and 159 of the transport portion 103. Therefore, two PC cards may be transported to be positioned at the inspecting portions 101 and 102 to which different contents of inspection are assigned, which makes it possible to perform different inspections on two PC cards simultaneously. Alternatively, the contents of the inspections at the inspecting portions 101 and 102 may be the same, which makes it possible to perform the same inspection on two PC cards simultaneously. Obviously, it is possible to perform an inspection using only either of the inspecting portions 101 and 102.

Two eject rods 129 pointed to both ends of the side of a PC card where the connector 136 is locate dare attached to the PCMCIA connector-side inspecting system 132. Each of the two eject rods 129 is driven by the eject mechanisms 130.

When the inspection of a PC card is terminated and the PCMCIA connector-side inspecting system 132 is retracted from the transport portion 103, the eject rods 129 are kept stationary without following up a movement of the card slot portion 123 in the positive Y-direction as a result of driving of the eject mechanisms 130. Therefore, the ends of the two eject rods 129 abut both ends of the PC card where the connector 136 is located when the PC card tends to move as the card slot portion 123 moves, which makes it possible to stop the movement of the PC card.

When the PC card and the card slot portion 123 are separated, the two eject rods 129 also moves in the positive Y-direction to exit the transport portion 103. Two eject mechanisms are preferably provided as in the present embodiment to urge both ends of the side of a PC card where the connector 136 is located. When the back connector-side inspecting system 133 is retracted from the transport portion 103, the edge of the PC card where the back connector 137 is located abuts the guide 153 as the PC card tends to follow the movement of the back connector-side inspecting system 133 in the negative Y-direction, which blocks the movement of the card in the negative Y-direction and therefore disconnects them.

To inspect the next PC card, the guides 164 and 166 are elevated after the PCMCIA connector-side inspecting system 132 and back connector-side inspecting system 133 are retracted from the transport portion 103. Then, the positioning/holding portion 150 is moved in the positive X-direction after the positioning pins 120 and 120' are lowered below the rail surfaces of the transport rails 158 and 159, and the next PC card is fed to the inspecting portions 101 and 102.

An inspected PC card is judged to be good or defective and, if judged as defective, the positioning pins 122 and 122' shown in FIG. 13 is lowered to put it in the defective card discharge portion 107 as the positioning/holding portion 150 moves in the positive X-direction. Since failures of the inspecting apparatus itself can occur when too many defective cards are accumulated, the full charge sensor 162 monitors them to automatically stop the apparatus when defective cards exceed a predetermined quantity.

When a PC card is good, the positioning pins 122 and 122' are elevated to block the movement of the PC card to the defective card discharge portion 107 and to position the same. The second push-out rod 114 is then moved in the negative Y-direction to push the PC card in the negative Y-direction, there by housing it in a vacant housing shelf of the supply magazine 200 located at the card housing portion 115. The above-described card inspecting apparatus is controlled by a PC as shown in FIG. 12A.

Figure 16:
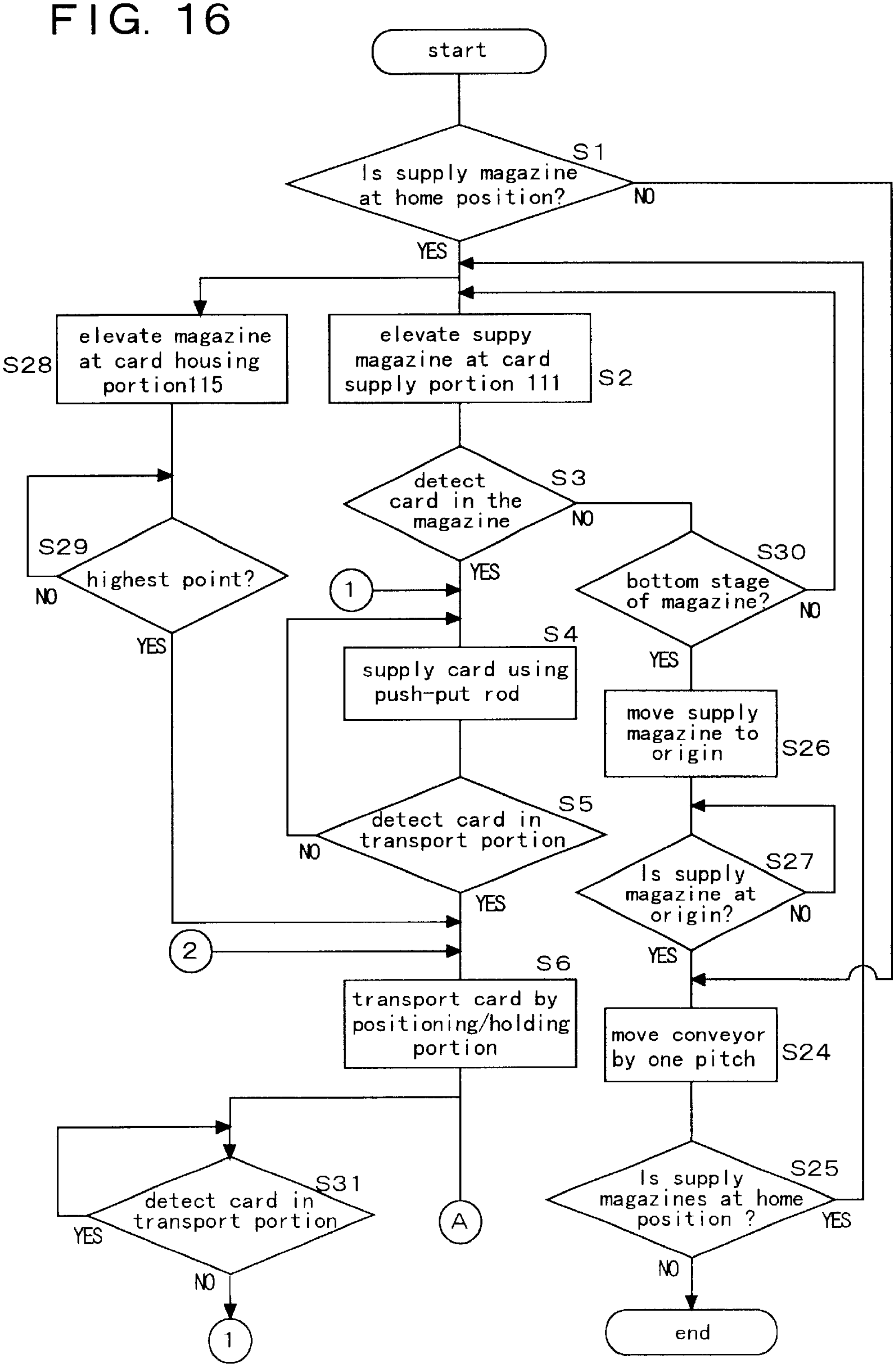
FIG. 16 is a flow chart of an operation of the card inspecting apparatus according to the second embodiment of the invention.
Figure 17:
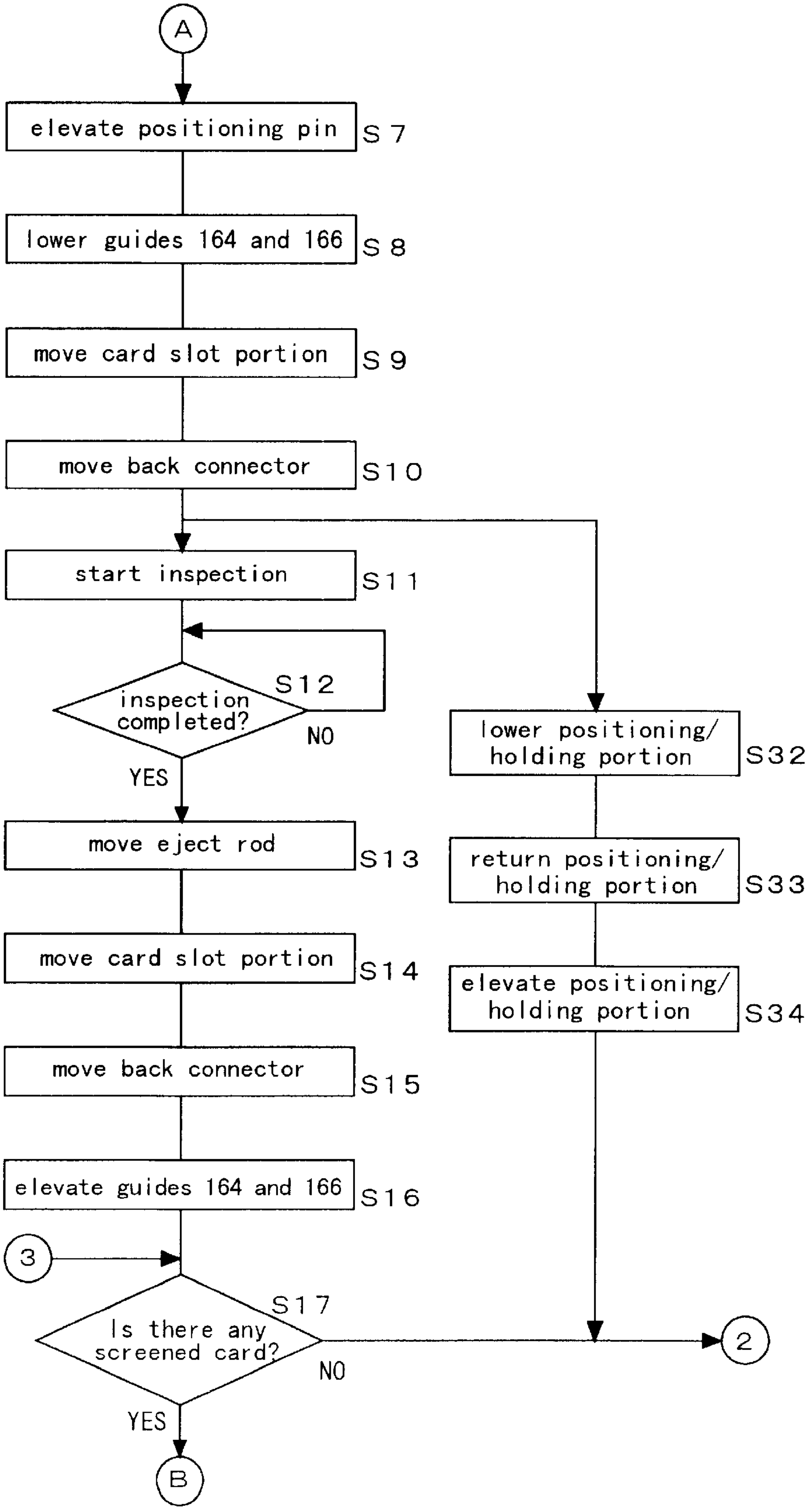
FIG. 17 is a flow chart of an operation of the card inspecting apparatus according to the second embodiment of the invention.
Figure 18:
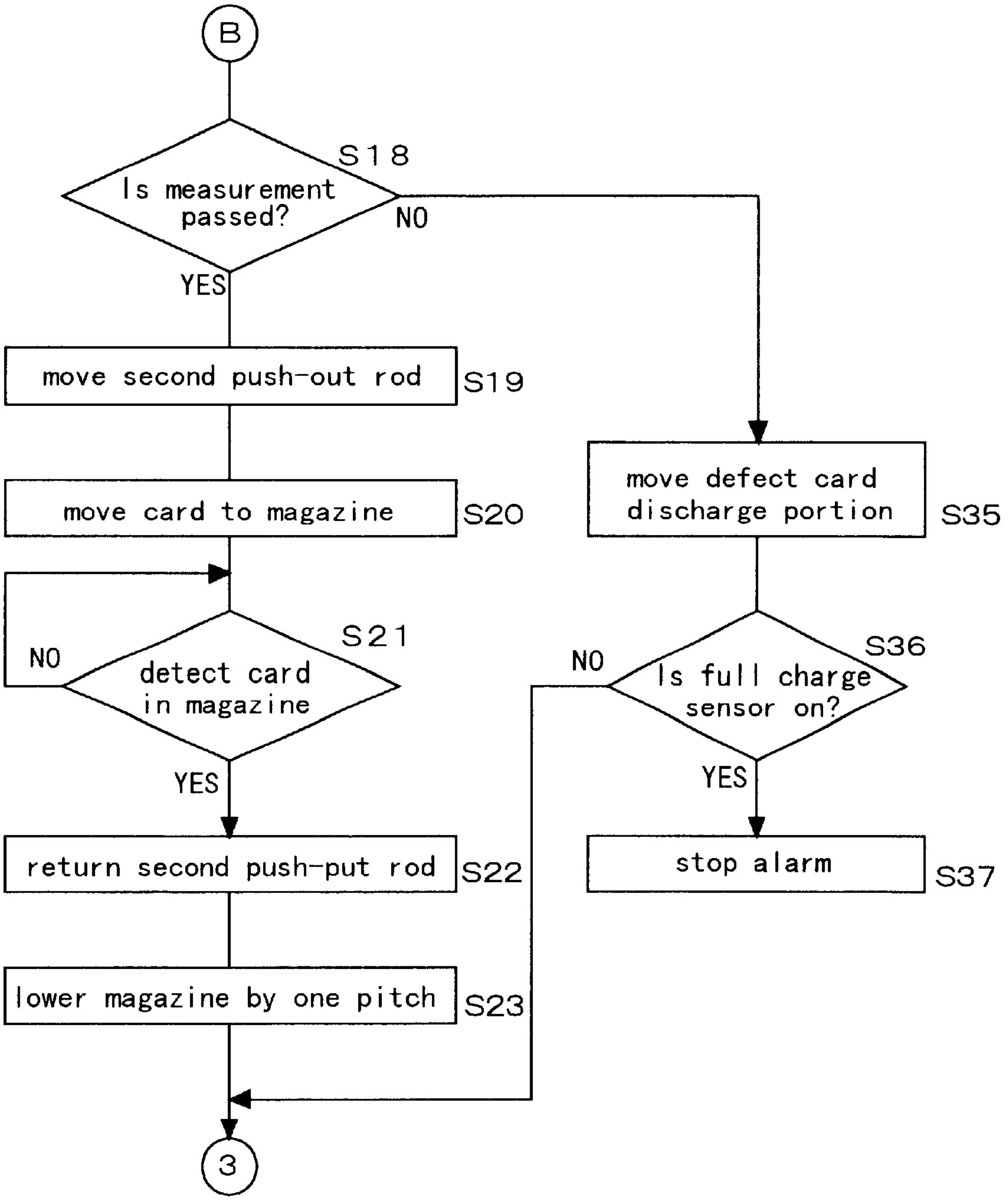
FIG. 18 is a flow chart of an operation of the card inspecting apparatus according to the second embodiment of the invention.

The operation of the card inspecting apparatus of the present embodiment will now be described with reference to the flow charts shown in FIGS. 16 through 18. When the power supply of the card inspecting apparatus is turned on to start control of the PC over the apparatus, it is first determined whether supply magazines 200 placed on the conveyor 110 are in predetermined positions or not (step S1). Such a determination is carried out by detecting whether supply magazines 200 are located at least in the card supply portion 111 and card housing portion 115 with sensors which are not shown. When it is determined that no supply magazine 200 exists in the predetermined positions, the process proceeds to step S24 to move the conveyor 110 by one pitch, and it is determined again whether supply magazines 200 are located at the card supply portion 111 and card housing portion 115 (step S25).

If it is determined at step S25 that no supply magazine 200 exists in the predetermined positions, the series of operations is terminated, and a message is issued through a display of the PC or the like. When it is determined at step S1 or S25 that supply magazines 200 exist in the predetermined positions, the PC instructs the lifter 160 to elevate the supply magazine 200 at the card supply portion 111 by a quantity corresponding to one housing shelf (step S2).

It is then detected whether a PC card is housed in a housing shelf on the supply magazine 200 (step S3). If no PC card is housed, the process proceeds to step S30 to check whether the PC card detection is being performed on the lowermost housing shelf of the supply magazine 200. If the lowermost shelf is not the object of detection, the process returns to step S2 to detect a PC card.

If it is determined at step S30 that the PC card detection is being performed on the lowermost shelf of the supply magazine 200, since the supply magazine 200 is empty, the PC instructs the lifters 160 and 161 to lower the supply magazines 200 located at the card supply portion 111 and card housing portion 115 to return them to the original positions (steps S26 and S27), and the process proceeds to step S24 where the conveyor 110 is moved by one pitch to locate the next supply magazines 200 at the card supply portion 111 and card housing portion 115.

When a PC card is detected at step S3, the PC controls the card supply portion 111 such that the push-out rod 112 protrudes into the housing shelf of the supply magazine 200 to push out the PC card into the transport portion 103 (step S4). At the transport portion 103, a card detecting sensor 152 detects whether the PC card has entered the transport portion 103 (step S5), and the process proceeds to step S6 if the sensor 152 detects the PC card.

When it is determined at step S1 that supply magazines 200 exist in the predetermined positions, the PC controls the lifter 161 such that the vacant magazine 200 located at the card housing portion 115 is elevated from the original position concurrently with the processes at steps S2 through S5 (step S28). When the vacant supply magazine 200 is elevated to a highest point in the Z-direction (step S29), the process proceeds to step S6. The operations at steps S28 and S29 are performed to maintain the stability of the position of the supply magazine 200 at the card housing portion 115 by sequentially housing good PC cards starting with the housing shelf at the bottom of the vacant supply magazine 200.

When the processes at both of steps S5 and S29 are completed, in order to transport the PC card to the inspecting portions 101 and 102, the driving of the positioning/holding portion 150 is started (step S6). Then, the positioning pins 120 and 120' of the inspecting portion 101 and the positioning pins 121 and 121' of the inspecting portion 102 are elevated to position the PC card transported by the positioning/holding portion 150 (step S7). Concurrently, the state of card detection by the card detecting sensor 152 of the transport portion 103 is monitored (step S31) and, if the card detection signal is off, the process proceeds to step S4 where the push-out rod 112 starts to feed the next PC card.

When the operation at step S7 is terminated, the process proceeds to step S8 to lower the guides 164 and 166 located at the inspecting portions 101 and 102. Then, the card slot portion 123 of the PCMCIA connector-side inspecting system 132 moves in the negative Y-direction (step S9); the back connector-side inspecting system 133 moves in the positive Y-direction (step S10); and an urging force of the back connector cover 138 establishes electrical connection between the back connector 137 of the PC card and the back connector 127 for measurement and between the connector 136 and the connector in the card slot portion 123. An electrical inspection on the PC card is thus started (step S11).

When inspections at the inspecting portions 101 and 102 are terminated (step S12), the eject mechanisms 130 are driven to project the eject rods 129 relative to the card slot portion 123 to urge the side of the PC card where the connector 136 is located to thereby disconnect the PC card and the card slot portion 123 (step S13). Then, the card slot portion 123 of the PCMCIA connector-side inspecting system 132 moves in the positive Y-direction to be retracted from the transport portion 103 (step S14), and the back connector-side inspecting system 133 moves in the negative Y-direction to be retracted from the transport portion 103 (step S15). The guides 164 and 166 are thereafter elevated (step S16).

When a preparation for an electrical inspection on a PC card is made at step S10, as shown in FIG. 14, the lifter 156 lowers the projections 151 of the positioning/holding portion 150 to a position lower than the surfaces of the transport rails 158 and 159 of the transport portion 103 (step S32); the piston of the cylinder 154 is then returned to the initial position (step S33); and the positioning/holding portion 150 is returned to the home position by elevating the substrate surface of the same to a position substantially flush with the surfaces of the transport rails 158 and 159 of the transport portion 103 by the lifter 156 (step S34).

It is determined at step S17 whether there is any PC card on which the inspections have been completed and, if there is no inspected PC card, the process returns to step S6 where the driving of the positioning/holding portion 150 is started again to transport a PC card to the inspecting portions 101 and 102. When there is an inspected PC, the process proceeds to step S19 if the card is good and to step S35 if the card is defective (step S18). At step S19, the positioning pins 122 and 122' are elevated to position the good PC card, and the second push-out rod 114 is driven to push out the PC card toward the card housing portion 115.

The PC card is then housed in a vacant housing shelf of the supply magazine 200 at the card housing portion 115 (step S20), and it is determined whether the card has been reliably housed in the housing shelf (step S21). When the card is housed in the housing shelf, the second push-out rod 114 is returned to the origin (step S22). The lifter 161 is then controlled to lower the supply magazine 200 at the card housing portion 115 by one pitch such that the next good PC card will be housed in the next upper vacant housing shelf located (step S23), and the process proceeds to step S17 to determine whether there is another inspected PC card.

If the PC card is defective, the positioning pins 122 and 122' are kept below the rail surfaces of the transport rails 158 and 159 instead of being elevated, and the defective PC card is discharged to the defective card discharge portion 107 as the positioning/holding portion 150 is moved (step S35). The PC monitors the full charge sensor 162 at the defective card discharge portion 107, provides an alarm indication and stops the apparatus (step S37) if the full charge sensor is on and returns to step S17 if the full charge sensor 162 is off to execute a routine to determine whether there is an inspected PC card.

As described above, according to the present embodiment, full automatic electrical inspections can be performed on, for example, about 250 to 300 PC cards by setting 5 or 6 supply magazines 200 on the conveyor 110. Further, since a plurality of inspecting portions such as the inspecting portions 101 and 102 can be provided, the time required for electrical inspections on PC cards can be reduced to improve the throughput of the inspections.

Furthermore, since it is also possible to perform different electrical inspections at a plurality of inspecting portions respectively, a variety of items to be inspected can be processed at a time by one card inspecting apparatus, which makes it possible to reduce the space occupied by an inspecting apparatus. Since an inspection can be performed by connecting the apparatus to all of a plurality of connectors of a PC card simultaneously, the inspection time can be decreased.

As described above, the present embodiment makes it possible to reduce the cost of card inspection and to improve the throughput of card inspection by allowing a plurality of cards to be inspected at a time. Moreover, the present embodiment makes it possible to perform an electrical inspection also on a back connector side of a card having a back connector. Furthermore, according to the present embodiment, a card can be smoothly inserted and removed at an electrical inspection.

[Third Embodiment]

Figure 19:
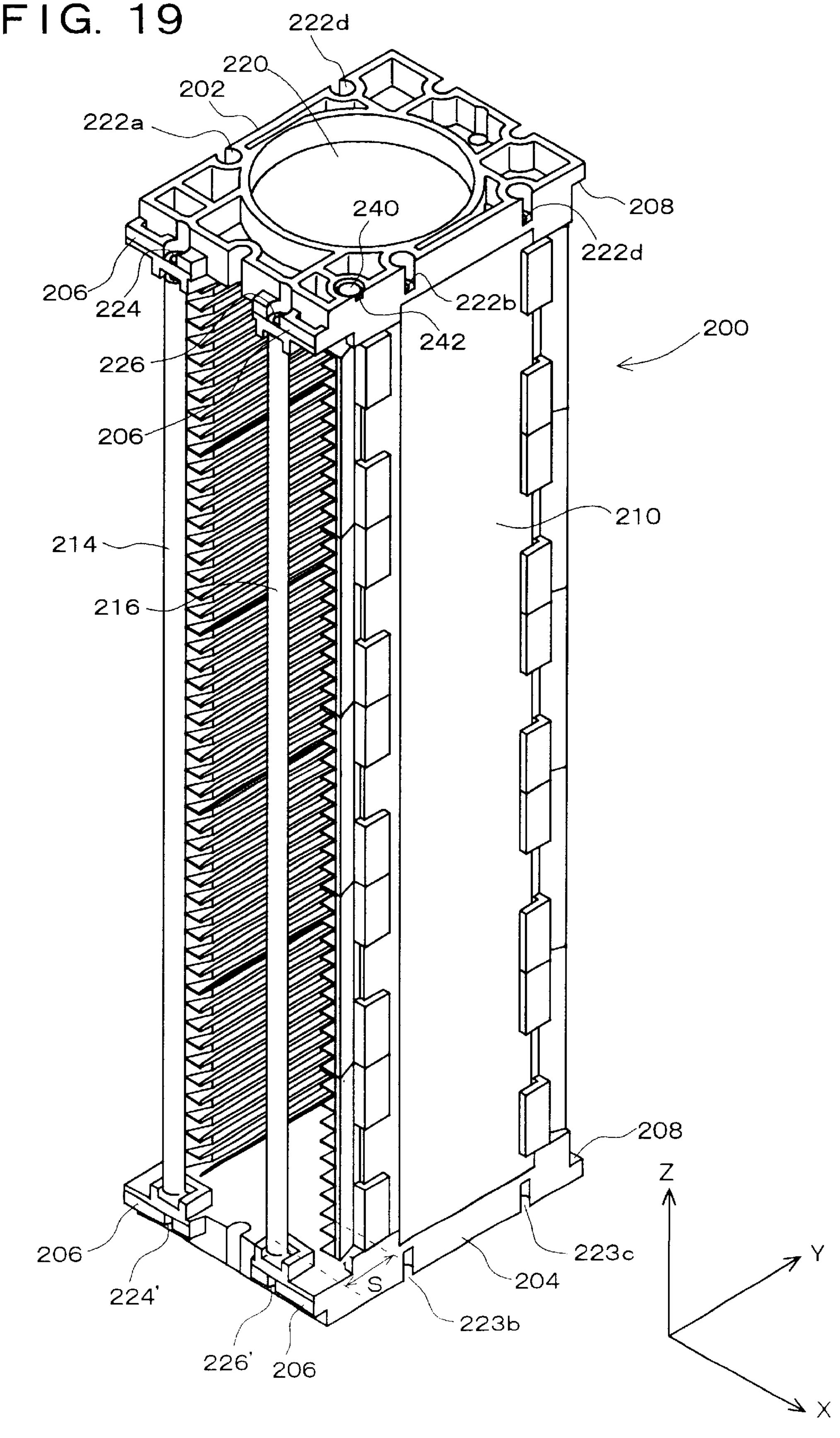
FIG. 19 is a perspective view of a card magazine according to a third embodiment of the invention showing a schematic configuration of the same.
Figure 20:
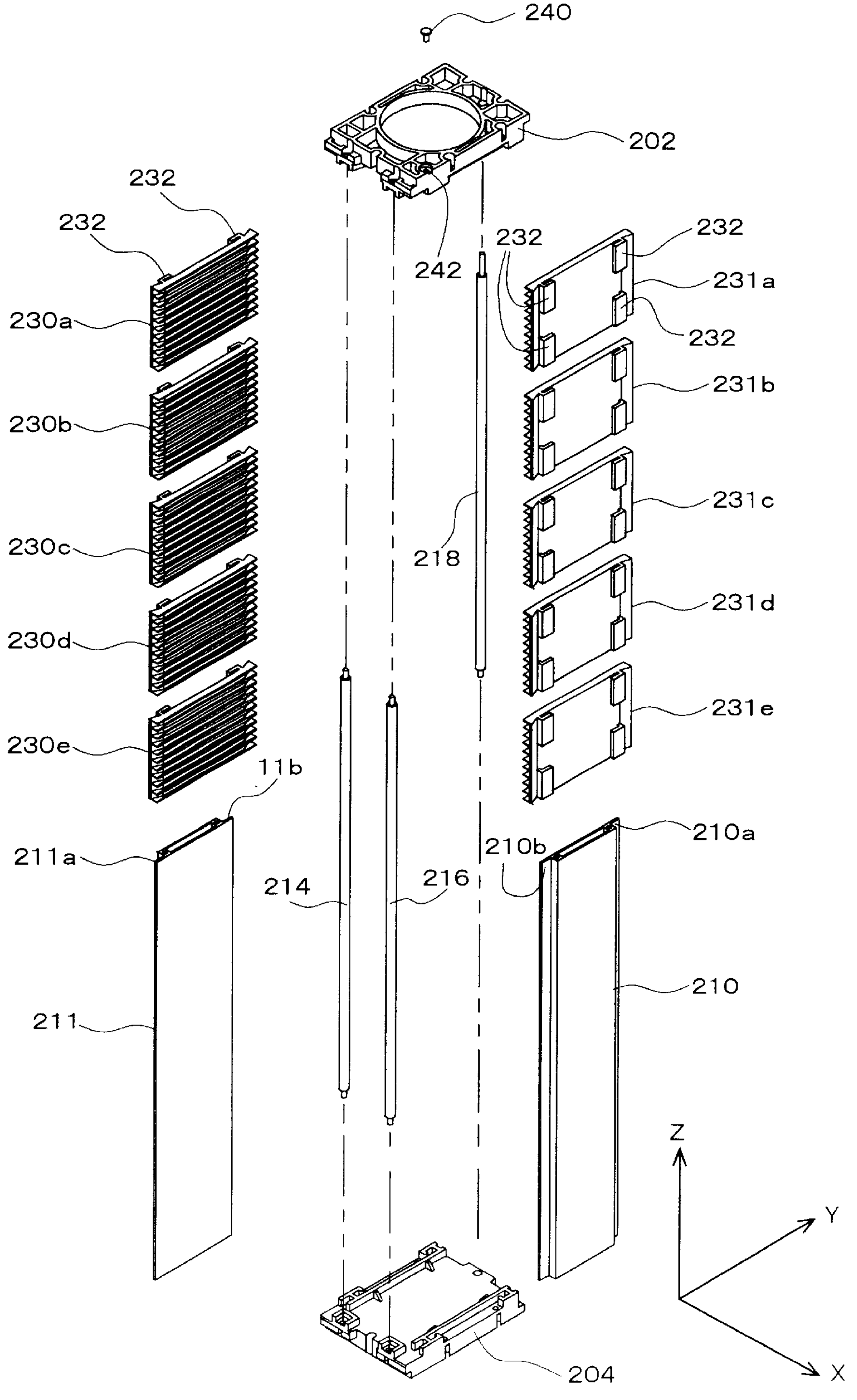
FIG. 20 is an exploded perspective view of the card magazine according to the third embodiment of the invention showing a schematic configuration of the same.
Figure 21:
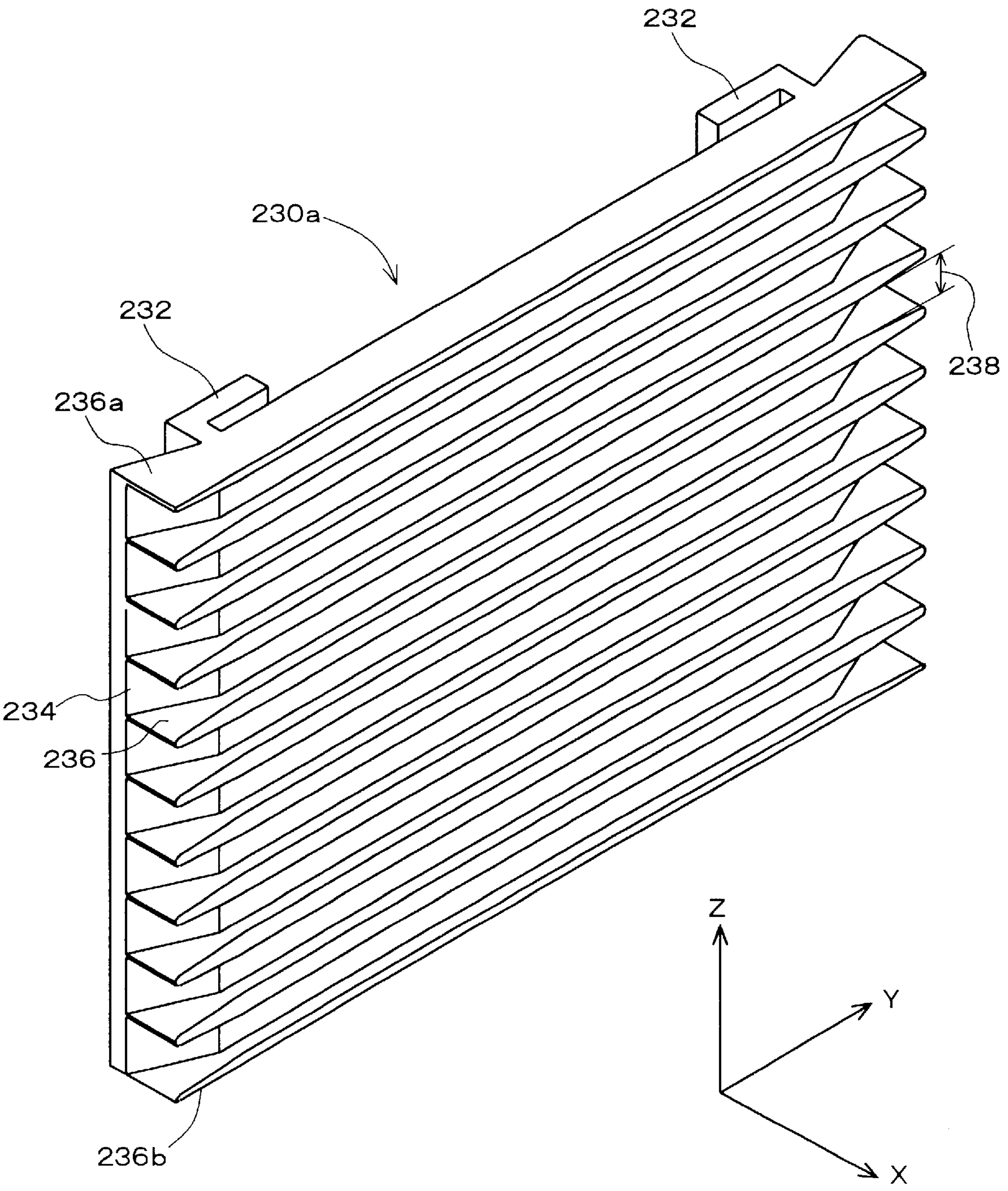
FIG. 21 is a perspective view of a resin side wall portion of the card magazine according to the third embodiment of the invention showing a schematic configuration of the same.

A card magazine according to a third embodiment of the invention will now be described with reference to FIGS. 19 through 21. The card magazine according to the present embodiment is used as the supply magazine 200 (housing magazine 84) of the card assembly apparatus according to the first embodiment. It is also used as the supply magazine 200 of the card inspecting apparatus according to the second embodiment.

A schematic configuration of the card magazine according to the present embodiment will be first described with reference to FIGS. 19 and 20. FIG. 19 is a perspective view of a card magazine 200 according to the present embodiment, and FIG. 20 is an exploded perspective view of the same. First, a description will be made on a schematic configuration of the card magazine 200 of the present embodiment as a whole. The magazine 200 has a housing having a general configuration like a rectangular parallelepiped in which a top portion and a bottom portion are secured together through both lateral portions and in which a front portion and a rear portion are open. According to a definition of the orientation of the card magazine 200 of the present embodiment using the coordinate system shown in FIGS. 19 and 20, the front side of the magazine 200 is at a greater Y value and the rear side thereof is at a smaller Y value. Therefore, the left side is at a greater X value, and the right side is at a smaller X value. The top side is at a greater Z value and the bottom side is at a smaller Z value.

A top portion 202 and a bottom portion 204 are respectively secured to hut plates 210 and 211 that constitute left and right side walls at four positions with screws 222*a* through 222*d* and screws 223*a* through 223*d*. The front and rear sides of the magazine 200 are open, and both ends of two rear-side stopper rods 214 and 216 are fitted in and secured to holes 224, 224' and 226, 226' formed on respective edges of the top portion 202 and bottom portion 204 on the rear side. Five each resin side walls 230*a* through 230*e* and 231*a* through 231*e* are inserted in and secured to the hut plates 210 and 211, respectively. A plurality of convex portions in the form of fins formed on the resin side walls 230*a* through 230*e* on the right side and the resin side walls 231*a* through 231*e* on the left side constitute guide rails which respectively hold cards to be contained on both sides thereof and which guide the cards from the opening on the front side and to the rear side.

A detailed description will now be made on each of the components of the magazine 200. The top portion 202 and bottom portion 204 are formed from resin such as plastic. A convex portion 206 is formed at each of the ends of the top portion 202 on the rear side, and a convex portion 206 is also formed at each of corners of the bottom portion 204 on the rear side. Recesses 208 are provided on both of the ends of the top portion 202 on the front side in positions opposite to the respective convex portions 206 on the rear side. Recesses 208 are provided on both of the ends of the bottom portion 204 on the front side in positions opposite to the respective convex portions 206 on the rear side. For example, when a plurality of cards assembled by the card assembly apparatus are housed in magazines 200 and an operator carries a plurality of magazines 200 to the card inspecting apparatus to perform the subsequent step, a first magazine 200 is placed such that the opening on the front side thereof faces vertically upward. Then, a second magazine 200 is placed on the first magazine 200 in an overlapping relationship such that the opening on the front side thereof faces vertically upward.

As a result, the four recesses 208 of the first magazine 200 engage the four convex portions 206 of the second magazine 200, and the operator can therefore lift and move the second magazine 200 along with the first magazine with stability by supporting the first magazine 200 at the top portion 202 and bottom portion 204 or the vicinity thereof with both hands. The third and later magazine 200 can be easily carried with stability by stacking them similarly. Since this prevents an operator from accidentally dropping the magazines 200 while moving the magazines 200, it is possible to prevent damage to the cards housed in the magazines 200. Further, it is possible to reliably prevent cards from dropping from the magazines 200 when the magazines 200 are carried by inserting and securing both ends of a front-side stopper rod 218 as shown in FIG. 20 into holes (not shown) provided near the middle of the ends of the top portion 202 and bottom portion 204 on the front side thereof.

The left and right side portions are respectively constituted by ten resin side walls 230*a* through 230*e* and 231*a* through 231*e* which are formed from plastic or the like and hut plates 210 and 211 which are formed from aluminum. The hut plate 210 of the left side portion is formed in a uniform planar configuration on the card housing side of the magazine 200, and guide portions 210*a* and 210*b* in the form of steps in the X-direction are formed on both edges of the opposite side of the plate extending in the Z-direction. Similarly, the hut plate 211 of the right side portion is formed in a uniform planar configuration on the card housing side of the magazine 200, and guide portions 211*a* and 211*b* in the form of steps in the X-direction are formed on both edges of the opposite side of the plate extending in the Z-direction.

The resin side walls 230*a* through 230*e* are provided with securing portions 232 which slide on the guide portions 211*a* and 211*b* of the hut plate 211 to move the respective resin side walls 230*a* through 230*e* in the Z-direction and which secure the respective resin side walls 230*a* through 230*e* to the hut plate 211. Each of the resin side walls 230*a* through 230*e* is provided with two each securing portions 232 in association with the guide portions 211*a* and 211*b* of the hut plate 211, i.e., four securing portions 232 in total. Similarly, the resin side walls 231*a* through 231*e* are provided with securing portions 232 which slide on the guide portions 210*a* and 210*b* of the hut plate 210 to move the respective resin side walls 231*a* through 231*e* in the Z-direction and which secure the respective resin side walls 231*a* through 231*e* to the hut plate 210. Each of the resin side walls 231*a* through 231*e* is provided with two each securing portions 232 in association with the guide portions 210*a* and 210*b* of the hut plate 210, i.e., four securing portions 232 in total.

The left side portion is formed by aligning the above-described four securing portions 232 formed on the respective resin side walls 231*a* through 231*e* with the guide portions 210*a* and 210*b* of the hut plate 210 and by sequentially moving the resin side walls 231*a* through 231*e* in the Z-direction along the guide portions 210*a* and 210*b* to secure the five resin side walls 231*a* through 231*e* to the hut plate 210. Similarly, the right side portion is formed by aligning the four securing portions 232 formed on the respective resin side walls 230*a* through 230*e* with the guide portions 211*a* and 211*b* of the hut plate 211 and by sequentially moving the resin side walls 230*a* through 230*e* in the Z-direction along the guide portions 211*a* and 211*b* to secure the five resin side walls 230*a* through 230*e* to the hut plate 211.

A description will now be made with reference to FIG. 21 on a configuration of the resin side walls 230*a* through 230*e* and 231*a* through 231*e* on the side thereof opposite to the side where the securing portions 232 are formed. FIG. 21 is a perspective view of the resin side wall 230*a* as viewed in the same direction as in FIG. 20. The resin side wall 230*a* will be described as a representative example because the remaining resin side walls 230*b* through 230*e* and 231*a* through 231*e* have the same structure. As apparent from FIG. 20, for example, ten guide rails 236 for slidably holding ends of PC cards are provided on the surface of the resin side wall 230*a* of a magazine 200 on the card housing side thereof.

As already described, PC cards in compliance with the PCMCIA standard have card type physical specifications (external configurations), e.g., a length of 85.6 mm and a width of 54.0 mm. They are categorized into types I, II and III depending on the thickness and, for example, the type II is 5 mm thick. Therefore, when type II cards are to be housed, intervals 238 between the guide rails 236 are set at about 6 mm.

In order to allow cards to be smoothly inserted, the guide rails 236 are chamfered into a gentle mount-like configuration to expand card inserting ends. The thickness in the Z-direction of guide rails 236*a* and 236*b* on both ends of the resin side wall 230*a* in the Z-direction is substantially one half of that of the other guide rails 236. Therefore, even if the plurality of resin side walls 230*a* through 230*e* and 231*a* through 231*e* are stacked along the hut plates 210 and 211 respectively, the combined thickness of the guide rails at the joints can be substantially equal to that of the other guide rails. Wall portions 234 vertically extending in the Z-direction between the guide rails 236 have wall end portions expanding in the X-direction at both ends thereof in the Y-direction.

As described above, the left and right side portions are formed by securing a plurality of, for example, five each left and right resin side walls 230*a* through 230*e* and 231*a* through 231*e* to hut plates 210 and 211 made of aluminum respectively. The hut plates 210 and 211 are secured to the top portion 202 and bottom portion 204 to allow a plurality of cards (50 cards in the present embodiment) to be stacked in the Z-direction in parallel with the X-Y plane between the guide rails 236 on the resin side walls 230*a* through 230*e* and the guide rails 236 on the resin side walls 231*a* through 231*e*. The use of the hut plates 210 and 211 made of aluminum makes it possible to reduce the possibility of warp of the side portions compared to a case where the side portions are formed by a single resin plate, and this makes it possible to maintain an optimum clearance for the width of cards to be housed. The plurality of (five each in the present embodiment) resin side walls used at the left and right side portions can be molded using a die smaller than those to be used for the formation of integral parts, which is advantageous in that the manufacturing cost of the die can be reduced.

The structure of the magazine 200 will now be described in more detail with reference to FIG. 19 again. Two cylindrical rear-side stopper rods 214 and 216 secured to the ends of the top portion 202 and bottom portion 204 on the rear side have a function of positioning inserted cards in the Y-direction in the magazine 200 when the cards are inserted and held in the guide rails 236 on the left and right side portions. Further, cards can be supplied into the card assembly apparatus or card inspecting apparatus by urging the cards with a rod-shaped member capable of moving in the Y-direction between the two rear-side stopper rods 214 and 216.

A gap S of, for example, about 2 cm is provided in the Y-direction between the rear-side stopper rods 214 and 216 and the rear-side ends of the resin side walls 230*a* through 230*e* and 231*a* through 231*e*. An observation through the gap S allows an operator to visually check the number of cards inserted and to roughly recognize the remaining manufacturing or inspection time. Further, a photoelectric sensor or the like may be provided at the gap S to easily and automatically detect the presence or absence of cards and the number of remaining cards.

A screw hole 242 for receiving a screw 240 for preventing erroneous installation is provided on the top portion 202 in addition to screw holes for screws 222*a* through 222*d* for securing the top portion 202 to the hut plates 210 and 211. A screw hole (not shown) for receiving a screw 240 for preventing erroneous installation is provided on the bottom portion 204 in addition to screw holes for screws 223*a* through 223*d* for securing the bottom portion 204 to the hut plates 210 and 211. The screw 240 for preventing erroneous installation is screwed into either the screw hole 242 on the top portion 202 or the screw hole (not shown) on the bottom portion 204.

As a result, when a magazine 200 according to the present embodiment is used as the supply magazine 200 (84) used in the card assembly apparatus according to the first embodiment or the supply magazine 200 or the like used in the card inspecting apparatus according to the second embodiment, an alarm can be issued by determining the presence or absence of the screw 240 for preventing erroneous installation to detect whether the orientation of the magazine 200 in the Z-direction is reversed or not. Thus, the simple structure achieved only by attaching a screw makes it possible to prevent an accident in which cards are erroneously inserted into the assembly apparatus or inspecting apparatus in a reverse attitude.

For example, disk-shaped mounting surfaces 220 to be placed on an elevating table of the lifter are formed in the middle of the top portion 202 and bottom portion 204. A magazine 200 placed on the elevating table of the lifter through the mounting surface 220 can be moved in the Z-direction as the elevating table of the lifter moves.

For example, full automatic electrical inspections can be performed on about 250 to 300 PC cards by setting 5 or 6 supply magazines on the conveyor 110 according to the second embodiment. It is therefore possible to decrease the time required for electrical inspections on PC cards and to thereby improve the throughput of the inspections.

The magazine 200 according to the present embodiment may be used not only for PC cards in compliance with the PCMCIA standard but also for IC cards, prepaid cards and the like as well as other cards as described above.

As described above, the present embodiment prevents a magazine or cards in the magazine from being dropped when the magazine is moved. This makes it possible to reduce the assembly and inspection costs of cards and contributes to an improvement of the throughput of card assembly and card inspection.

Further, according to the present embodiment, since a plurality of cards can be supplied to and house in a magazine, a plurality of cards can be continuously assembled or inspected without any intervention of an operator.

What is claimed is:

1. A card inspecting apparatus, comprising:

a conveyor for moving a supply magazine loaded with cards containing a substrate incorporating electrical parts and a vacant supply magazine loaded with no such cards which are placed thereon;

a card supplying portion for picking up the cards from said supply magazine loaded with the cards;

a transport portion for transporting the card pick up by said card supplying portion;

an inspecting portion for performing a predetermined electrical inspection on the cards transported by said transport portion; and a card housing portion for housing good ones among the cards which have been electrically inspected in said vacant supply magazine.

2. A card inspecting apparatus according to claim 1, wherein a plurality of said inspecting portions are provided along a transport path of said transport portion.

3. A card inspecting apparatus according to claim 2, wherein said inspecting portions have a plurality of connectors for measurement of a card having a plurality of connectors which are respectively connected to the plurality of connectors.

4. A card inspecting apparatus according to claim 3, wherein said inspecting portions have an eject mechanism for preventing movement of said connected card when the connectors of said card and said connectors for measurement are disconnected.

* * * * *

UNITED STATES PATENT AND TRADEMARK OFFICE

CERTIFICATE OF CORRECTION

PATENT NO. : 6,574,528 B1
DATED : June 3, 2003
INVENTOR(S) : Takashi Toya et al.

It is certified that error appears in the above-identified patent and that said Letters Patent is hereby corrected as shown below:

Title page,
Insert:
-- [30] Foreign Application Priority Data
August 20, 1999 [JP] Japan.........................11-233603
September 10, 1999 [JP] Japan.........................11-258023
October 26, 1999 [JP] Japan.........................11-304238 --

Signed and Sealed this

Twenty-eighth Day of October, 2003

JAMES E. ROGAN
*Director of the United States Patent and Trademark Office*